United States Patent
Andries et al.

(10) Patent No.: US 8,898,262 B2
(45) Date of Patent: *Nov. 25, 2014

(54) MANAGEMENT SYSTEM AND METHOD FOR CONFIGURING A NETWORK FOR TRANSFERRING DATA

(75) Inventors: Luc Maria Jozef Andries, Borgerhout (BE); Piet Marie Alfons Rosa Demeester, Ghent (BE)

(73) Assignee: SDNSquare, Korbeek-Lo (BE)

( * ) Notice: Subject to any disclaimer, the term of this patent is extended or adjusted under 35 U.S.C. 154(b) by 607 days.

This patent is subject to a terminal disclaimer.

(21) Appl. No.: 13/145,878

(22) PCT Filed: Jan. 22, 2010

(86) PCT No.: PCT/EP2010/050724
§ 371 (c)(1),
(2), (4) Date: Aug. 29, 2011

(87) PCT Pub. No.: WO2010/084172
PCT Pub. Date: Jul. 29, 2010

(65) Prior Publication Data
US 2012/0030319 A1   Feb. 2, 2012

Related U.S. Application Data

(60) Provisional application No. 61/146,480, filed on Jan. 22, 2009.

(30) Foreign Application Priority Data

May 19, 2009   (EP) .................................... 09160647

(51) Int. Cl.
G06F 15/16   (2006.01)
(Continued)

(52) U.S. Cl.
CPC ............ H04L 47/10 (2013.01); H04L 41/5009 (2013.01); H04L 41/5025 (2013.01);
(Continued)

(58) Field of Classification Search
CPC . H04L 47/10; H04L 41/5009; H04L 41/5025; H04L 47/11; H04L 47/2441
USPC .................. 709/234, 224, 220, 235; 370/252, 370/230.1, 412, 236
See application file for complete search history.

(56) References Cited

U.S. PATENT DOCUMENTS 6,223,211 B1   4/2001   Hamilton et al.
6,937,568 B1 *   8/2005   Nicholl et al. ................ 370/236
(Continued)

FOREIGN PATENT DOCUMENTS

EP   1560375 A1   8/2005

OTHER PUBLICATIONS

International Search Report for PCT/EP2010/050724, Completed by the European Patent Office on Feb. 26, 2010, 3 Pages.

(Continued)

Primary Examiner — Jungwon Chang
(74) Attorney, Agent, or Firm — Workman Nydegger

(57) ABSTRACT

A method for configuring a network path of a network for transferring a data flow, whereby said path has a network device susceptible of network congestion and arranged for storing at least a part of the data flow. The method includes determining at least one possible path for transferring between locations of source and destination a data flow, the data flow being classified according to a footprint measure indicative of a possible difference between the total amount of incoming data and the total amount of outgoing data in the at least one network device over a time interval having a duration of one or more time units, the time unit is chosen that individual data units of the at least one data flow are distinguishable at byte level by the network device, and configuring the at least one path according to the footprint measure.

15 Claims, 15 Drawing Sheets

(51) Int. Cl.

| | | |
|---|---|---|
| *H04L 12/801* | (2013.01) | |
| *H04L 12/24* | (2006.01) | |
| *H04L 12/26* | (2006.01) | |
| *H04L 12/851* | (2013.01) | |
| *H04L 29/06* | (2006.01) | |
| *H04L 29/08* | (2006.01) | |

(52) U.S. Cl.
CPC ........ *H04L 41/5035* (2013.01); *H04L 43/0829* (2013.01); *H04L 47/11* (2013.01); *H04L 47/17* (2013.01); *H04L 47/2441* (2013.01); *H04L 65/80* (2013.01); *H04L 67/1097* (2013.01); *H04L 41/509* (2013.01)
USPC ............................ 709/220; 709/234; 709/235

(56) References Cited

U.S. PATENT DOCUMENTS

| | | | | |
|---|---|---|---|---|
| 8,612,625 | B2* | 12/2013 | Andries et al. ................ 709/234 |
| 2004/0114518 | A1* | 6/2004 | MacFaden et al. ........ 370/230.1 |
| 2005/0094572 | A1 | 5/2005 | Mimura et al. |
| 2006/0155532 | A1 | 7/2006 | Nam et al. |
| 2007/0153702 | A1* | 7/2007 | Khan Alicherry et al. ... 370/252 |
| 2007/0201499 | A1* | 8/2007 | Kapoor et al. ................. 370/412 |

OTHER PUBLICATIONS

Siripongwutikorn et al. "Adaptive Bandwidth Control for Efficient Aggregate QoS Provisioning", Globercom. 2002, p. 2435-2439.

Nananukul et al. "Controlling Short-Term Packet Loss Ratios Using an Adaptive Pushout Scheme", Proceedings of IEEE Conf Jun. 2002, p. 49-54.

Yoshino et al. "Performance Optimization of TCP/IP over 10 Gigabit Ethernet by Precise Instrumentation", AMC/IEEE Conference on High Performance Computing SC2008, Nov. 2008, 12 Pages.

Feng et al. "Packet Spacing: An Enabling Mechanism for Delivering Multimedia Content in Computational Grids", The Journal of Supercomputing 2002, vol. 23, p. 51-66.

* cited by examiner

Traffic Class characterisation

| Class | Main Class | Sub Class | Type | Timing sensitivity | Description | Network Protocol | Application Protocol | Destination oversubscription |
|---|---|---|---|---|---|---|---|---|
| 0 | 0 | 1 | IT traffic | Asynchr | Generic | Any | Any | Yes |
| 1 | I | 1 | Media | Asynchr | Large file xfer | TCP | FTP | No |
| 2 | I | 2 | Media | Asynchr | Large file xfer | TCP | FTP | Yes |
| 3 | II | 1 | Media | Synch | RT Streaming | RTP/RTCP | Proprietary | No |
| 4 | II | 2 | Media | Synch | RT Streaming | TCP | Proprietary | No |
| 5 | II | 3 | Media | Synchr | RT Streaming | UDP | Proprietary | No |
| 6 | III | 1 | Media | Asynchr | Frame sensitive traffic | TCP | FTP (?) | No |
| 7 | III | 2 | Media | Asynchr | Frame sensitive traffic | TCP | FTP (?) | Yes |
| 8 | III | 3 | Media | Asynchr | Frame sensitive traffic | UDP | ? | No |
| 9 | III | 4 | Media | Asynchr | Frame sensitive traffic | UDP | ? | Yes |
| 10 | IV | 1 | Media Storage | Asynchr | Large block Storage traffic | TCP | GPFS | Yes |
| 11 | IV | 2 | Media Storage | Asynchr | Large block Storage traffic | TCP | iSCSI | Yes |
| 12 | IV | 3 | Media Storage | Asynchr | Large block Storage traffic | TCP/UDP | Generic FS | Yes |
| 13 | V | 1 | File system | Asynchr | Small block file system traffic | TCP | NFS | Yes |
| 14 | V | 2 | File system | Asynchr | Small block file system traffic | UDP | NFS | Yes |
| 15 | V | 3 | File system | Asynchr | Small block file system traffic | TCP | CIFS/SMB | Yes |
| 16 | V | 4 | File system | Asynchr | Small block file system traffic | UDP | CIFS/SMB | Yes |
| 17 | VI | 1 | Priority traffic | Asynchr | Priority traffic | Any | Any | Yes |

Fig. 11

Class I traffic - Traffic passport: Large file xfer

- Traffic Class: 1-2
- Main class: I – Sub class: 1-2
- Type: Media
- Timing sensitivity: Asynchronous
- Description: Large file xfer
- Network Protocol: TCP
- Application Protocol: FTP
- Application Example: Ardftp - ftp
- Typical source: Media cluster server (e.g. GPFS NAN node)
- Network cloud: IP client cloud
- Destination oversubscription: No (Sub class 1) – Yes (Sub class 2)
- Delay sensitivity: No
- Jitter sensitivity: No
- Priority: High (Sub class 1) – Low (Sub class 2)
- Network protocol Flow Control: Yes
- Source flow control: Possible (ardftp)
- Burstiness Q-footprint: Random bursty
- Maximum burst size: Infinite
- Macroscopic Bandwidth Source: Source limitation (?) (ardftp)
- Macroscopic Bandwidth Network: Network BW limitation
- # streams per source server: Many
- Traffic pattern: Many-to-many
- Traffic control: Central (workflow/traffic mgmt)

Fig. 12

MANAGEMENT SYSTEM AND METHOD FOR CONFIGURING A NETWORK FOR TRANSFERRING DATA

CROSS-REFERENCE TO RELATED APPLICATION

This application is the U.S. national phase of PCT Appln. No. PCT/EP2010/050724 filed Jan. 22, 2010 which claims the benefit of U.S. provisional application 61/146,480 filed Jan. 22, 2009 and European application 09160647.5 filed May 19, 2009, the disclosures of which are incorporated in their entirety by reference herein.

FIELD OF THE INVENTION

The present invention generally relates to the field of data transfer, in particular media data transfer, over IP networks.

BACKGROUND OF THE INVENTION

The advent and maturing of Internet technology over the last few decades has totally changed the landscape of the information technology (IT) industry. The absolute success and popularity of (mostly Ethernet based) Internet Protocol (IP) networks has promoted this technology as the prime architectural choice in most IT environments. Central mainframe computers have in most cases been replaced by distributed client-server architectures connected by very powerful IP networks.

This technology is steadily being introduced in other industries as well. Although adoption and above all acceptance of these new technologies was at first occurring rather slowly in the media world, IP based architectures are now fully accepted as the standard solution for file based media production and have drastically changed the way broadcasters operate and function internally.

FIG. 1 illustrates how broadcasters have been operating for long in a sequential video tape based workflow model. Since video tapes were used as physical carrier of the essence material, the person in possession of the video tape had sole and single access to the material. Distributing copies of the same material to other people had to be accomplished by playing out the video tape in real time and record it on another tape recorder(s). In order to perform all tasks in the production workflow, the tasks were executed in a sequential or linear way, each time handing over the result, stored on video tape, to the next workstation. Metadata was typically passed along the video cassette on small paper slips or attached post-its. This led to long lead times in production or dead-lines well before the moment of broadcasting on antenna.

In recent years broadcasters have finally started to embrace Internet technology in their production back-office, leading to a collaborative workflow model. Applying an ICT based infrastructure and IP networks as means of transport, in particular in video/media production, introduces a number of substantial possible benefits, facilitating the fundamental shift from traditional tape-based video manipulation to a file-based production paradigm. This technology leap enables video to be treated, processed, stored and transported as ordinary files independent of the video format, instead of the continuous streams used by the classical media technology of today. Amongst others, the most profound technology changes are:
  IP-network based access and transport of the media
  Central disk-based media storage
  Server-based (non-linear) video editing or processing
  Software-based media management and media production systems Together with the appearance of standards like MXF (Material eXchange Format) and AAF (Advanced Authoring Format), which provide for a generic file-container for the media essence, these changes lead to the file-based paradigm of media essence. As a practical consequence, this brought some of the major broadcasters to their 'tape-less' TV production vision. This idea is further supported by the appearance of camera devices with storage facilities other than the traditional videotapes, e.g. optical disks (Sony) or Solid State memory cards (Panasonic).

Typically camera crews now enter the facilities with their video stored as ordinary files on memory cards in stead of on video tape. The memory cards are put into ingest stations, e.g. ordinary PCs, and the files are transferred as fast as possible, preferably faster than real time, into a central disk based storage system. Once stored in the central system, everybody can access the material simultaneously. Most video operations, such as visioning, video selection, high resolution editing in postproduction, sonorisation, subtitling, annotation and even archiving can be performed in parallel without different people having to wait for each other. This leads in principle to a much more efficient workflow, provided this new workflow and the underlying data flows make optimal use of the benefits and opportunities created by this architecture. Production lead times should become shorter and dead-lines should be closer to the moment of broadcasting on antenna.

A typical example of such a file based infrastructure is schematically depicted in FIG. 2. On the left hand side, the video sources are depicted. These include uploads from tape based old archives, real-time feeds, tape based inputs (video players), file based camera inputs and production servers in studios. On the top, one finds the non-linear, file-based, high resolution software-based editing suites, both local or on a remote site. On the right hand side, several play-out channels are listed, including classical linear broadcasting and internet web farms. A web farm is a group of web servers serving different web sites, whereby each web site is administered by its own webmaster and centralized monitoring provides load balancing and fault tolerance. All these peripheral systems are connected via a central IP network with the central infrastructure, which provides a massive central storage warehouse for different flavours of the media, e.g. high resolution video, low resolution proxy video and audio. Additional central services such as trans-coding and backup/archiving are also included. All media essence is managed by a central Media Asset Management (MAM) system.

An example of a simple workflow may be the ingest of a video clip from a file based camera into the central storage and the selection of the material and transport to the high resolution editing work centre. The workflow consists of essentially 3 steps:

The material is transferred from the memory card of the file-based camera into the central storage system.
  A low resolution proxy is created so that any journalist can view the material and select the relevant clips. The journalist creates an editing decision list (EDL) to mark his selection.
  The system uses this EDL to transport the selected pieces of material to the non-linear file-based editing suite. There the journalist together with the professional editing technician performs the editing and creates the result again as a media file, or multiple media files.

In the earlier tape-based linear era this workflow would also consist of three consecutive steps:

The camera crew comes in with the media material on a video tape and hands the tape over to one of the journalists.

The journalist views the tape to select the relevant shots and notes the time codes.

The journalist takes the original tape to the tape-editing work centre where a professional editing technician spools the tape back and forth to the noted time codes and records the resulting video, together with some effects, back on a final new video tape.

Remark that in the linear tape-based workflow, the steps have to be executed one after the other and only one person can use the material at the same time. In the non-linear flow, material can be accessed by multiple persons. As soon as the first frames of the material are being transferred to the central storage, the creation of the first frames of the low resolution version is started and any journalist can start viewing the low resolution proxy. The moment the first selection is made, the corresponding high material can already be transferred to the editing suite, where the final editing can start.

When translating to an actual data flow, the data transfers required to execute this workflow for each ingested clip give rise to an actual data flow which is clearly much more complex than the simple workflow would suggest. There are several reasons for this unexpected complexity. File-based media solutions first appeared in the separate work centres as small islands, e.g. non-linear editing systems with the size of a small workgroup, each with their own local small IP network, their own storage and some servers and clients. Further, most of the times the original tape-based linear workflow is simply mimicked on the overall file-based architecture by connecting the file-based work centre solutions together with an central IP network and performing the same linear workflow as before, but now using files in stead of tapes. Thirdly, since the file-based architecture of the individual work centres has not been optimized to fit efficiently in an integrated overall file-based workflow, a lot of extra file transfers are required. E.g. trans-coding is a separate work centre from the central storage. Hence, format conversion to proxy video requires fetching the video from the central storage, transporting it over the central IP network to the trans-coding engines, trans-coding there locally and transporting the result back again to the central storage. If this trans-coding process consists of several consecutive steps, multiple transfers back and forth over the central IP network are required. Different work centres from different vendors require different patterns of MXF file wrappers. This is the way in which media is packed into a file or multiple files. E.g. the camera stores video and audio each in a separate file. The media asset management system requires the media to be stored in one single file on the central storage. While the editing work centre again only deals with separate video and audio files. Using IT technology like disk-based storage requires additional operations typically not used in a video tape-based classical broadcast environment, such as, mirroring a second copy on a separate storage system, making several back up copies on data-tape, both on-line in a tape-robot, or off-line on a tape shelf. These extra operations have mainly to do with redundancy and/or data protection schemes, such as back up and recovery, which are standard procedure for the IT industry. Lack of trust between media engineers and IT architects results in storing extra copies of the media, to be extra sure not to loose the essence because of failing technology. Most of the time, the mapping of the work flow on the actual data flow and resulting file transfers is done ad hoc and not well documented by the suppliers of the media work centre solutions or the overall integrator.

At peak time, when many of the different workflows are executed at the same time, as many as 500 or more simultaneous file transfers may be launched on the central infrastructure. Evidently, this puts a very high and largely unexpected load on the central IP network. Transfers share the bandwidth on some of the links and server interfaces on the network. The network becomes oversubscribed, with mutual interference of different transfers as a consequence. On top of this, IT traffic is intrinsically different from media traffic. Files are much longer. Traffic is burstier. Consequently, an IP network, such as it is usually designed in a classical IT environment, reacts differently to this new kind of traffic, with unexpected delays and even broken transfers as result. Packet loss is far less acceptable when dealing with media files. Whereas a slow e-mail is still an e-mail, a slow video is no longer a video.

The need for a system to handle adequately the data transfer requirements of multimedia systems, particularly broadcast quality video, was already recognised in patent document U.S. Pat. No. 6,223,211. It proposes a system wherein the problems of latency, flow control and data loss are overcome and data movement within a client system memory in a distributed multimedia system is minimized so as to enable real-time transmission of broadcast quality media data over the network. Latency is reduced by an estimation by the server of client needs. Data loss is prevented and flow control is provided by permitting the server to send only as much information as the network interface can reliably receive. Data movement is minimized by copying data directly from the network interface to memory of input/output devices such as display and audio processors as well as main memory.

In the paper "Packet Spacing: an enabling mechanism for delivering multimedia content in computational grids" (A. C. Feng et al. *Journal of Supercomputing*, vol. 23, pp. 51-66, 2002) the authors mention they observed significant packet loss even when the offered load was less than half of the available network bandwidth. This behaviour was found to be due to simultaneous bursts of traffic coming from client applications and overflowing the buffer space in the bottleneck router. Metaphorically, this could be viewed as what happens at a major highway interchange during rush hour where everyone wants to go home simultaneously at 5 pm, thus "overflowing" the highway interchange. To avoid such a situation, some people self-regulate themselves by heading home at a different time, i.e., spacing themselves out from other people. Similarly, a solution is proposed wherein packets are spaced out over time. The inter-packet spacing with control feedback enable UDP-based applications to perform well, as the packet loss can be reduced considerably without adversely affecting the delivered throughput.

A similar approach was presented in the paper "Performance Optimization of TCP/IP over 10 Gigabit Ethernet by Precise Instrumentation" (Yoshino et al., *ACM/IEEE Conference on High Performance Computing*, SC2008, November 2008, Austin, Tex., USA), where long-distance large-bandwidth networks are discussed. The paper deals with the difficulties to be solved before utilizing Long Fat-pipe Networks (LFNs) by using TCP. One of the identified problems is the short-term bursty data transfer. A precise packet analyzer is disclosed that is capable of analyzing the real data transfer over 10 GbE LFNs. In order to avoid packet loss a packet pacing method is used.

EP1560375 describes a rate adaptation method and device in the presence of network congestion. It relates to a storage system transferring storage data using a multiple of network paths between the source and destination of the system, whereby the traffic is load balanced with a certain predetermined ratio over the different paths. In the described method congestion or congestion recovery is reported or detected by some component in the system, typically after the collection of some packet loss statistics. A new traffic rate over the network paths is determined according to some calculation algorithm. Traffic is then redistributed by the source over the multiple network paths applying this new determined rate, possibly reducing the flow rate over the congested path and/or changing the load balancing distribution over the multiple paths.

US2006/155532 relates to an apparatus and method for managing quality of MPLS (Multi-Protocol Label Switching)-based label switched path (LSP) in a convergence network. The method comprises the step of periodically polling an egress node for MPLS OAM (Operation and Management) packets if it is determined that the LSP makes use of these packets. The payload of these packets contains performance information gathered during the passage of the LSP. Additionally the method polls periodically statistical information from each node of the LSP for number and size of packets at each node and number and size of dropped packets. With this information the management apparatus determines whether the quality of the LSP is appropriate for the requirement of the network policy or not, and re-establishes the LSP or performs a bandwidth adjustment to comply with the policy. The polling period of the MPLS OAM packet and the LSP statistical information is typically 15 minutes.

The paper "Controlling Short-Term Packet Loss Ratios Using an Adaptive Pushout Scheme" (Nananukul et al.; Proceedings of IEEE conf 2000 Heidelberg Germany, June, pp. 49-54) describes a theoretical model to characterize a packet loss process accurately. It operates under the assumption that QoS requirements can be classified into packet delay requirements and packet loss requirements. It proposes to include short-term packet loss ratios and maximum packet loss ratio on top of long-term packet loss ratio to define a deterministic loss model. It then proposes an adaptive pushout scheme to selectively drop packets at a single network node which allows this single network node to monitor and control the packet loss process at this network node so that the flow locally conforms to the loss model. Simulations were performed at very low service rates (64 kbps) to validate the results.

The paper "Adaptive bandwidth control for efficient aggregate QoS provisioning" (Siripongwutikom et al., Globecom'02, November 2002, pp. 2435-2439) proposes an adaptive bandwidth control algorithm to provide QoS defined by guaranteed aggregated packet loss and optimal bandwidth allocation. Its basic assumption states that static bandwidth allocation fails due to the lack of a detailed characterisation of input aggregate traffic, being specified most of the time roughly only in terms of the long term average rate or peak rate. In the lack of such a characterisation, it describes as an alternative an adaptive fuzzy feedback mechanism that adapts the allocated bandwidth, or service rate, to maintain an average queue length which indirectly achieves the target 'short term' loss requirement. It thereby only needs the long-term average arrival rate from the input traffic. However, in order to avoid bandwidth trashing and to keep a stable feedback control mechanism, the solution is limited to control timescales in the order of 1 second or longer.

AIMS OF THE INVENTION

The present invention aims to provide a method for configuring a network for data flow transfer, whereby the features of data flow are taken into account in order to tackle the problem of packet loss. The invention also aims to provide a management system for configuring such a network for data flow transfer. The invention further aims to provide a network device for use in such network for data flow transfer.

SUMMARY

In a first aspect the present invention relates to a method for configuring a network path of a network for transferring a data flow. In an advantageous embodiment the data flow is a media flow, whereby media flow is to be construed as a flow of media related data. The network path comprises at least one network device susceptible of network congestion and arranged for storing at least a part of the data flow. In the method at least one possible path is determined for transferring a data flow between possible locations of source and destination. The data flow has been classified according to a footprint measure of said flow. The footprint measure is indicative of a possible difference between the total amount of incoming data and the total amount of outgoing data in the network device over a time interval having a duration of one or more time units, whereby the time unit is so chosen that individual data units of the data flow are distinguishable by the network device. Individual data units can be individual bytes or a chunk of a few bytes, or constitute complete packets or even a group of a few packets. In a second step the at least one network path that was determined in the previous step is then configured according to the footprint measure.

Optionally, the method comprises the initial step of performing a classification of the data flow in question according to the corresponding footprint measure. The footprint measure may be available e.g. as a result of analysing sniffer traces of the data flow. Alternatively, the method of the invention may start with the determination of a footprint measure of the data flow and a subsequent classification step.

A crucial element in the invention is the concept of footprint measure. This measure provides an indication of the burstiness of the data flow. It thus yields a 'footprint' of the data flow in question. In the proposed solution it is essential that a footprint measure be determined at a sufficiently high time resolution. With 'sufficiently high' is meant at a timescale wherein time units correspond in order of magnitude to the length (duration) of bytes of a data packet of the data flow. Only then sufficient information is obtained to characterise the data flow with enough detail to be able to configure the network path so as to combat packet loss efficiently.

The network path comprises at least one network device where possibly a problem of congestion can occur during the data flow transfer. The network device may be a network switch, but can also be a source or even a destination. Most often, there is more than one network device in the network path. The footprint gives an indication of a possible difference between the total amount of incoming data and the total amount of outgoing data in the network device over a time interval that corresponds to one or more time units at the high time resolution as previously mentioned, i.e. time units so chosen that individual data units of the data flow (data packets or even just one or a few bytes of a data packet) are distinguishable at byte level. The footprint measure indicates a possible difference, in the sense that it sets a level that should not be exceeded. In a preferred embodiment, wherein the footprint measure is represented by a single parameter, the footprint measure is set at the maximum difference between the total amount of incoming and outgoing data that can possibly occur over any considered time interval. In this way it is guaranteed that packet loss is avoided. Alternatively, the possible difference can be derived from a prediction of the source behaviour.

In a preferred embodiment the step of configuring the at least one network path comprises designing a layout of the physical layer of the network path, i.e. setting a parameter related to its physical layout. For example, the bandwidth, the number of physical paths, . . . can be set.

In another preferred embodiment, possibly in combination with the embodiment in the previous paragraph, the configuring step comprises designing a logical layout of the network path, i.e. setting at least one parameter related to its logical layout. The design of the logical layout advantageously comprises setting the routing of the at least one network device. In another embodiment the design of the logical layout may also comprise setting at least one quality-of-service parameter of the network device.

In a preferred embodiment the configuration step is performed dynamically. In this way variations over time of the at least one network path can be dealt with.

In the configuration step it is advantageous to take into account at least one further characteristic of the data flow. The method may then comprise the explicit further step of determining the additional characteristic(s) of the data flow.

In a second aspect the invention relates to a management system for configuring a network path of a network for transferring a data flow, whereby the path comprises at least one network device susceptible of network congestion and arranged for storing at least a part of the data flow. The management system comprises a traffic management module arranged for determining at least one possible path for transferring between possible locations of source and destination a data flow, said data flow being classified according to a footprint measure of the flow. The footprint measure is indicative of a possible difference between the total amount of incoming data and the total amount of outgoing data in a network device on a network path over a time interval having a duration of one or more time units, whereby said time unit is so chosen that individual data units of the at least one media flow are distinguishable by the network device. The individual data units may contain a few bytes, a complete data packet or even a few packets. The management system is further arranged for configuring the at least one network path according to the footprint measure.

In a preferred embodiment the traffic management module is capable of setting at least one quality-of-service parameter.

The traffic management module is preferably arranged for imposing traffic restrictions and/or for shaping traffic to be transferred over said network path.

In another preferred embodiment the traffic management module is arranged for dynamically reconfiguring the at least one network path.

In yet another embodiment the traffic management module is arranged for actually launching the data flow.

The traffic management module is advantageously arranged for monitoring the at least one network device.

The management system is in a preferred embodiment a multi-layer system that, apart from the traffic management module, further comprises a data flow management module for controlling the data flow. The data flow management module is arranged for communication with the traffic management module and for controlling the traffic management module. The data flow management module is preferably further arranged for receiving information on the load of the network.

On top of the data flow management module the management system may comprise a work flow management module for managing work flows of a media process. A media process typically comprises of a sequence of consecutive operations on a file of media related data, such as ingest, transcoding, rewrapping, editing, whereby inbetween the operations or as a consequence of an operation this media file is transferred between the different devices performing the operations. The consecutive file transports constitute the actual physical data flow. The work flow management module is arranged for communication with the data flow management module.

In a further aspect the invention relates to a network device for use in a network for transferring a data flow over a path of the network. The network device is provided with buffering means for storing at least a part of the data flow and is arranged for setting at least one parameter so that a footprint measure of the data flow received at an input of the network device is so adapted that the data flow with the adapted footprint measure at the network device's output is better protected against packet loss, whereby the footprint measure is indicative of a possible difference between the total amount of incoming data and the total amount of outgoing data in the network device over a time interval having a duration of one or more time units, whereby the time unit is so chosen that individual data units of the data flow are distinguishable by the network device. The individual data units may contain a few bytes, a complete data packet or even a few packets.

In a preferred embodiment the network device is arranged for shaping the data flow at the level of individual data units.

In a specific embodiment the network device is a network switch. The data flow traffic shaping is then preferably performed at the ingress side of the switch. Shaping can preferably be performed at any given percentage of the link bandwidth.

In an advantageous embodiment the at least one parameter is the number of data units of the data flow, whereby said number is selectable. The at least one parameter can preferably be set dynamically.

BRIEF DESCRIPTION OF THE DRAWINGS

FIG. 11 illustrates more detail of the traffic classification.

FIG. 12 represents an example of a traffic passport.

DETAILED DESCRIPTION OF THE INVENTION

The invention capitalizes on an in-depth analysis of the differences in behaviour of large media data transfers over IP networks as compared to IT traffic such as SAP traffic, MS Office documents or e-mails. IT traffic typically consists of short messages or small files. The IP network is typically used for only relatively small periods of time. Transfer speed is not critical. Packet loss and the resulting retransmission are acceptable. Media traffic, however, deals with very large files, generally a few gigabytes in size, transmitted at speeds faster than real time, i.e. in relation to the video compression format used. Hence, media traffic typically uses the link for a large time period and almost constantly tries to use 100% of the available bandwidth of the network infrastructure. The longer this period, the more bursty the traffic becomes. If different transfers share the same link, bandwidth competition between individual concurrent transfers occurs. This generates packet loss. The resulting retransmissions drastically decrease the overall efficiency of the transfers. If sustained, this can lead to complete transfer interruption.

First a detailed analysis of the difference between the network handling of IT traffic and media traffic is given. The distinction between both can be made clearer by using the following analogy (see FIG. 3). Consider two IT clients, e.g. running Word and Excel, sending IT traffic at a speed of 400 Mb/s to a common file server. Suppose the traffic consists of a small file or even simple commands in response to some keystrokes of the user, resulting in 800 Mb/s being received by the server. This type of traffic can be related to the way cars drive on a two lane highway, see left hand side of FIG. 4. After passing the cross point, i.e. the switch, the two lanes have to merge into one lane. Most of the time this happens quite efficiently without too much traffic delay, since streams of cars nicely 'zip' together. In the IT environment the server indeed receives traffic at 800 Mb/s, without much delay. Bandwidth or throughput nicely adds up in a linear way in most cases.

Figure 3:
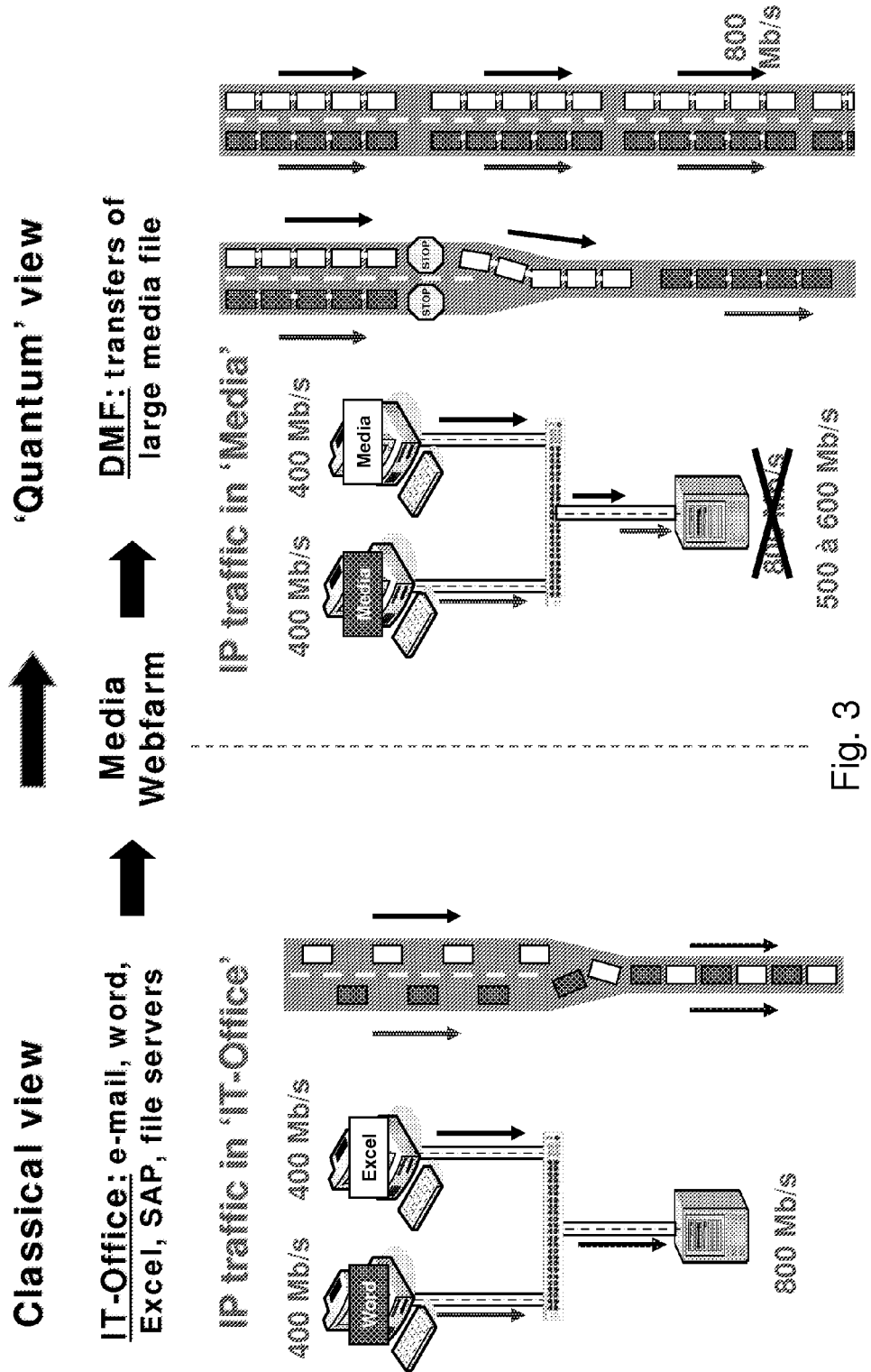
FIG. 3 illustrates the behaviour of large media file transfers over an IP network.

However, circumstances are different when dealing with transfers of large amounts of media data (see right hand side of FIG. 3). Now, the traffic consists of sustained very large bursts of packets arriving back to back. Two clients sending simultaneously large files to the same server at 400 Mb/s no longer manage to get all the traffic through to the server without interference. One could, using a similar analogy, describe the traffic as trains running on two tracks, where the switch acts like a junction. If both trains approach undisturbed the junction at the same time, they crash into each other, leading to a catastrophe, and traffic is stopped. Consequently, the receiving media server does not attain an aggregated throughput of 800 Mb/s, but much less. Throughput can no longer be added linearly. Ideally, each train should have its own track or otherwise traffic lights should be installed to manage a possible congestion. Translated to the IP network world, ideally the architecture of the media IP network should provide for separate links for each traffic flow. This is however only technically and practically feasible for very small setups.

Figure 1:
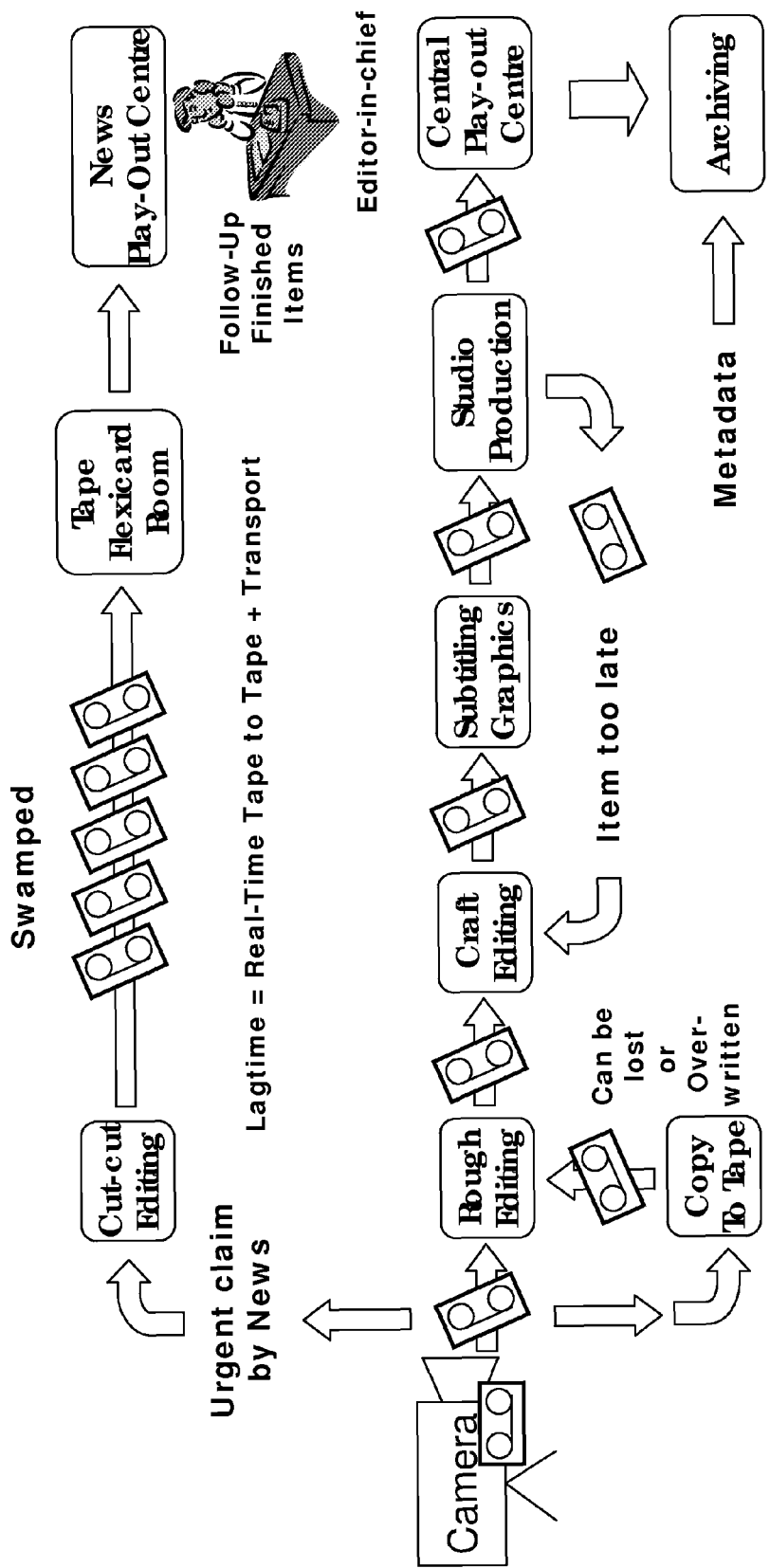
FIG. 1 illustrates the sequential workflow model as well known in the media industry.
Figure 2:
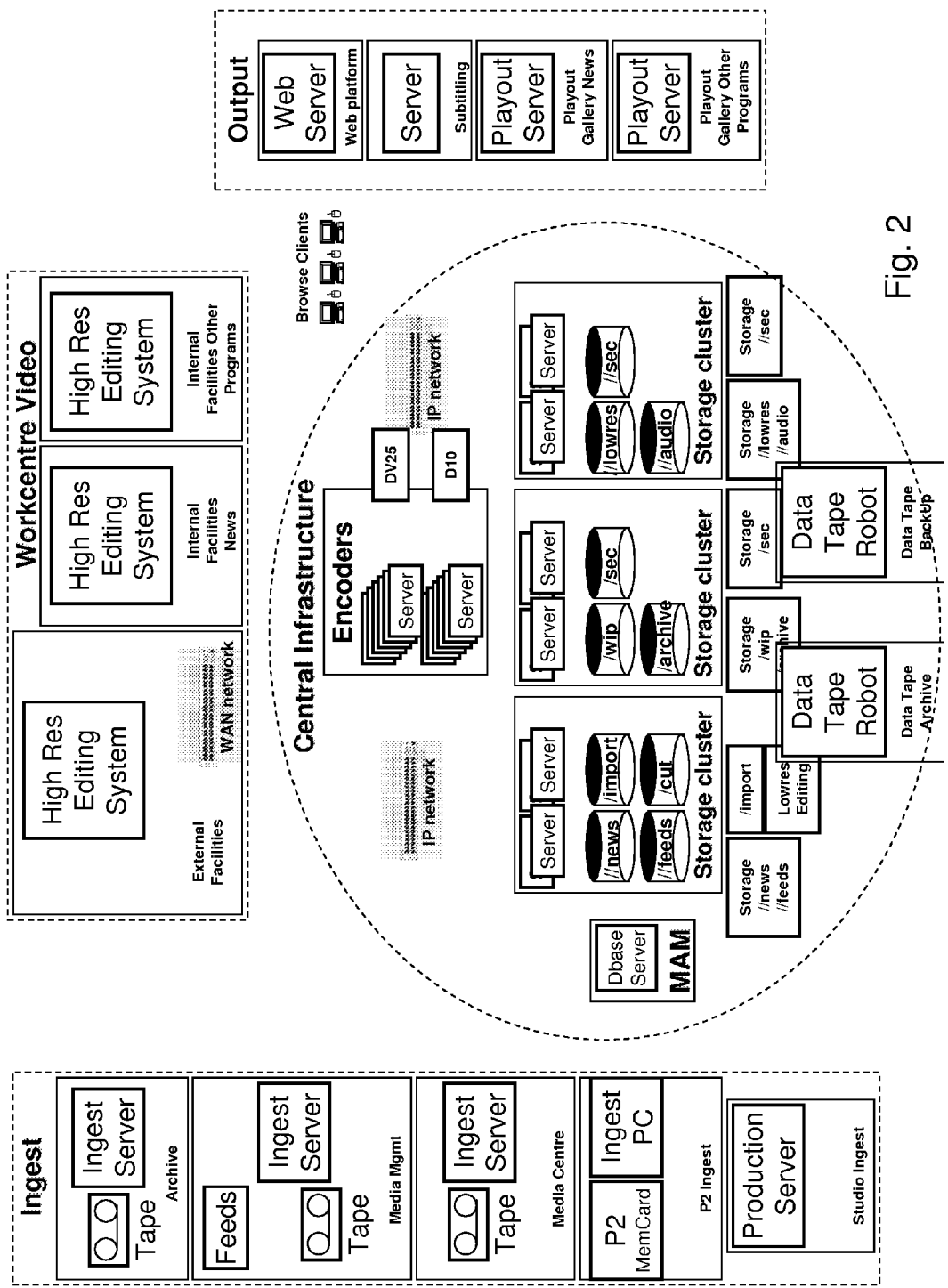
FIG. 2 illustrates an example of a digital media factory.

Clearly, an IP network shows a different behaviour when loaded with transfer of large amounts of media data. The IP network doesn't behave 'as expected'. Throughput decreases and becomes unpredictable. Transfers get lost. Above all, these effects are not limited to very large architectures, such as the digital media factory of FIG. 2. They also appear in very small installations with only a few clients and servers. The effects are not evidently visible when applying the classical network monitoring tools. IP networks, and more specifically IP over Ethernet networks, are already being deployed by the IT industry for more or less three decades. It has become 'the' standard in local area networking in the enterprise world, the LAN. Together with the ubiquitous adoption of this technology came along a large number of network monitoring practices and subsequent monitoring tools. These tools are however geared towards monitoring and managing IT traffic on IP networks and are certainly not optimized or adapted for tracking the specific media traffic described above. They typically deal with measuring throughput by averaging over relatively long time intervals. When in the last couple of years this IT technology was introduced in the media world of the broadcasters, the media engineers have embraced the same monitoring tools to manage their media IP networks. They have learned to apply the same monitoring practices to detect and resolve network problems as the IT industry has been doing for decades. This is what further in this description is referred to as the 'classical view on an IP network'.

In order to deal with the 'unexpected' behaviour on the IP network in the media environment, the way the network has to be monitored and the tools that have to be used are fundamentally different. With the application of IP technology in the media world, strange effects started to appear that couldn't be explained by the 'classical view' held by the IT industry. These effects can only be explained if one starts to look at the network on a completely different time scale, several orders of magnitude smaller than what classical network monitoring tools are capable of. At that timescale concepts like 'average network throughput' become meaningless, since the network starts to behave in a discrete way. A network link is loaded with a packet or it is idle. There is no such thing as a 'bandwidth percentage' anymore. One has to look at the network in a quantised way. This way of looking at an IP network is referred to as the 'quantum view on an IP network'.

Figure 4:
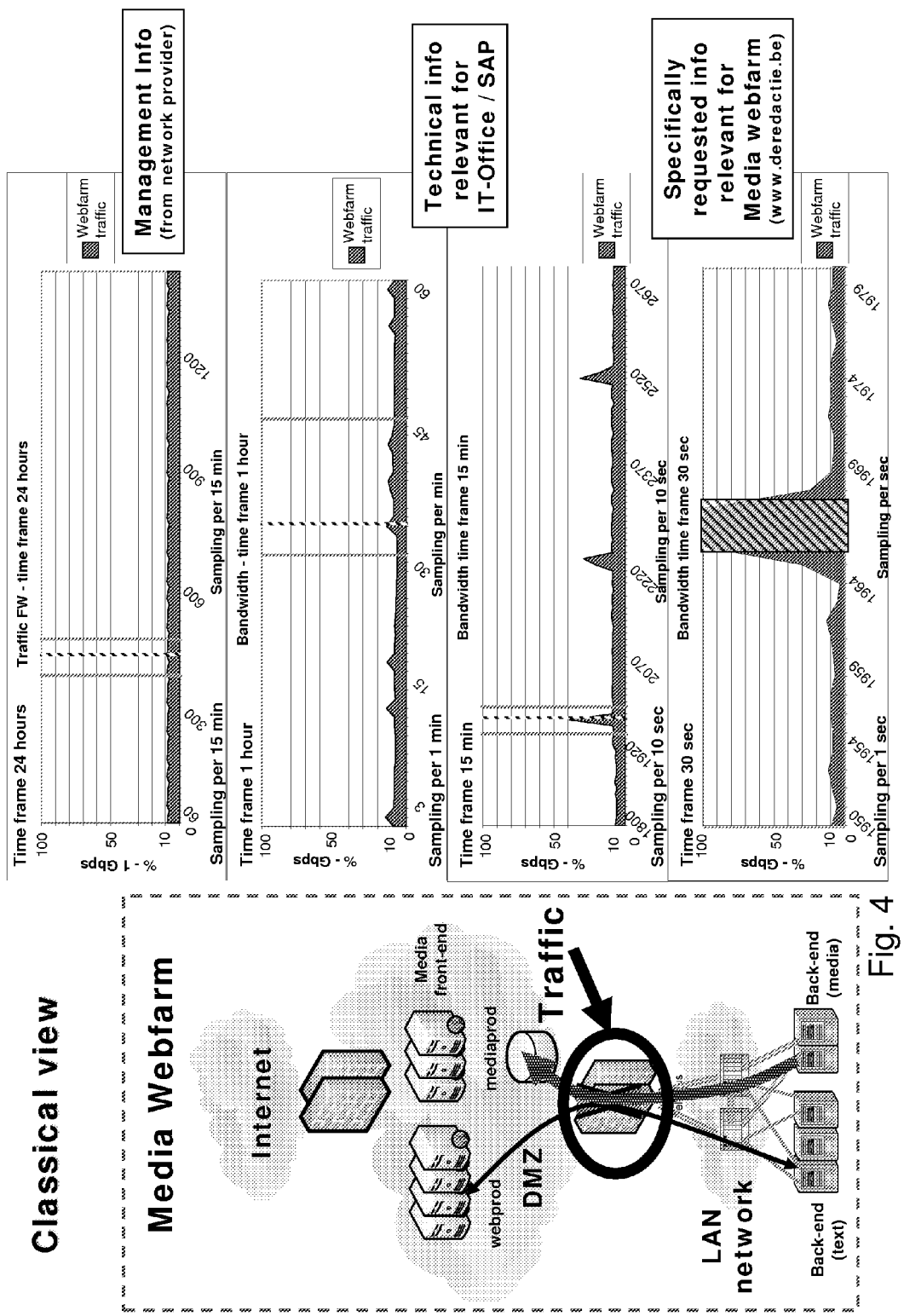
FIG. 4 illustrates the classical view on an IP network.

A typical environment where the 'classical view' starts to break down is a media web farm, i.e. a news web site enriched with a lot of video items (see FIG. 4). The architectural setup depicted on the left side of FIG. 4 consists of three parts, namely an internal LAN with a text-based back-end and the media file servers, a demilitarized zone (DMZ) network with the actual web servers and media front-end and the Internet, whereby all parts are separated by firewalls. The text-based web pages are loaded from the 'text-based' back-end through the DMZ firewall to the web front-end. The video items are loaded from the media file servers via the same firewall to the media front-end. Hence, both IT-type traffic, the web pages, and media traffic, the video clips, pass via the same link of the DMZ firewall. During high load of the web farm, suddenly and very unpredictably problems start to occur. The web site 'hangs'. The first network load report generated by the network provider shows a flat continuous throughput of 10% of the full link capacity (see top graph on FIG. 4). Traffic was sampled every 15 minutes. A more detailed graph (2nd graph on FIG. 4), sampled every min, shows a similar behaviour. The most detailed traffic view that could be provided shows some small peaks at 30% of the max throughput (see 3rd graph on FIG. 4, sampling period every 10 sec). This is the kind of information that is typically provided by the IT network monitoring tools. Clearly, the network link of the DMZ is not the problem. However, deeper analysis with a more specialised tool generated the bottom graph of FIG. 4, with a sampling period of 1 sec. The same small '30%' peaks appear now to completely fill the link for a duration of 3 to 4 sec. During these peaks, the web server frontend can't reach its back-end. This connectivity interruption can potentially be long enough to stall the web farm application. This is an example where interference between media traffic and IT traffic on the same link has disrupted the proper operation of an 'IT-type' web application. Clearly, the classical IT network monitoring tools and practises proved to be inadequate to uncover the underlying problem and make a correct assessment of the situation.

Figure 5:
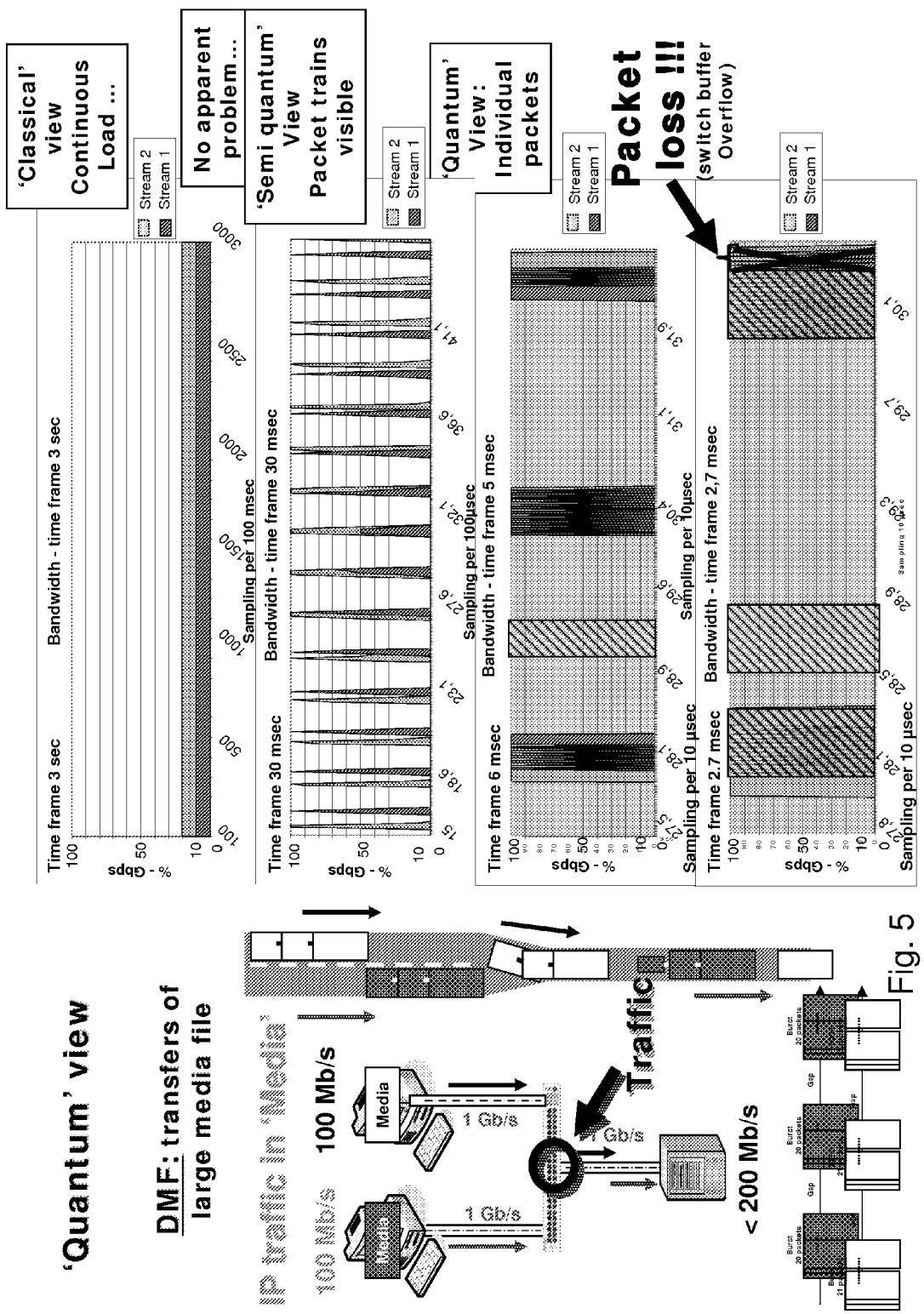
FIG. 5 illustrates the view on an IP network at 'quantum' timescale.

What has been described above, balances on the edge where the 'classical view' is challenged. In a full blown media environment the following media case clearly describes the underlying phenomena for the 'unexpected' behaviour when large media transfers are involved (see FIG. 5). In FIG. 5 two media clients are sending simultaneously a large media file towards the same server destination. All devices are connected by Gb/s links. Media traffic consists typically of large bursts due to the prolonged sustained traffic. Suppose both clients are only using 10% of the bandwidth of their respective network link. The traffic of the left client uses bursts of 20 packets, while the right client uses 21 packets per burst. Both transfers pass the switch and share the link towards the destination server. The 'classical view' predicts that the total server throughput should be equal to the linear sum of the client throughputs, matching 200 Mb/s. This is apparently confirmed if throughput would be measured with a sampling interval of 100 msec. Note that this requires an already more than 10 times more refined time resolution than that available in the IT monitoring systems. At a sampling interval of still a 1000 times more refined time resolution (100 µsec) the packet bursts or 'trains' should become visible (see second graph of FIG. 5). The time scale is still 10 times larger than the individual packets. One can distinguish the bursts of two flows overtaking each other. This results from the slight mismatch in packet burst length between the two flows. The individual bursts still appear to rise and fall in a continuous way. The two lower graphs zoom in on a timescale in the order of magnitude of the length of a single packet. Then the behaviour or characteristics at byte level becomes apparent. The overlapping bursts are displayed. Now, the discrete quantised behaviour of the network becomes visible. This is a suitable timescale for a true 'quantum view' of the network. In some cases the quantum timescale can have time units at the order of the length of one or more individual bytes. If a packet is transmitted, the link is used for 100%. If no packet is transmitted, e.g. in between two bursts, the network link is idle. On this timescale there is no such thing as 50% usage. During the burst overlap the following happens in the switch. Two packets arrive at the same time into the switch. In the same timeframe only one packet can leave the switch towards the server. One packet has to be buffered by the switch, until the outgoing link becomes idle. The vertical shaded bands indicate the buffer capacity of the switch. On the left of the lower graph, the buffer capacity is larger than the overlap of the two incoming bursts. The switch has enough buffer capacity to store the excess of incoming packets, until the incoming bursts have passed. The switch then transmits the stored excess of packets towards the server. The overall length of the resulting burst towards the server equals the sum of the length of the two incoming bursts. On the right of the graph, the situation is depicted where the two incoming bursts precisely overlap in time. Here, the buffer capacity is too small to store all excess packets during the total overlap. Once the buffer exceeds its limits, the remaining excess packets are being dropped by the switch. This example clearly indicates that in a classical IP network in a media environment, even at a fraction of the maximum macroscopic bandwidth usage, packet loss can and will occur.

The result of this effect depends on the network protocol being used. In the typical case of TCP, packet loss results in retransmissions and the source throttles back its throughput. The total transfer time increases drastically and becomes unpredictable, which leads to a considerable loss in efficiency. Even worse, if the load increases and the packet loss is sustained, transfers possibly will fail, daemons can stop functioning and eventually the application can crash. The UDP protocol has no mechanism to recover from packet loss. Hence, it is up to the application to deal with that problem. The classical network tools are definitely not able to monitor at this 'quantum' timescale. This requires very specific capturing equipment. Due to the large amount of data that have to be captured, those devices can typically sustain such precise monitoring for only a few seconds. Hence, it is very difficult to detect precisely when this effect has happened in the field.

The described effect has to be extrapolated towards a production environment as previously described where during peak load 500 or more simultaneous file transfers are occurring, randomly distributed between any two servers. Typically some 100 transfers are being lost each day.

The fundamental characteristic of the IP traffic that is different in media compared to IT is the fact that media traffic typically consists of large sustained packet bursts. If on top of that, different flows share a common link, they start to interfere with each other on a very small timescale, where the 'quantum view' rules. The interfering bursts generate a local oversubscription of the switch buffers on the 'quantum timescale' which introduces packet loss. This occurs even if there is sufficient bandwidth in the network on macroscopic timescale. Clearly, the classical view on an IP network is no longer valid in a file-based media environment. In order to understand what happens, one has to look at the network on a different level, on different timescale, with different tools and new monitoring practices. The way IP traffic is characterised and defined in the IT world has to change in order to fit the digital media challenge. Macroscopic quantities, such as average bandwidth, oversubscription, available or used capacity are no longer the only relevant parameters and have to be interpreted in a different way. Additional specifications and definitions on the 'quantum level' are required. Since continuous monitoring and measuring on this 'quantum' timescale becomes problematic, a deeper understanding of the detailed traffic characteristics and network switch and buffer mechanisms have to be modelled. Out of these models new relevant macroscopic and measurable quantities have to be identified.

The classical IT switches lack the proper buffers or Quality of Service (QoS) capabilities to tackle this issue. Or, in case high end switches are being used, the QoS is not tuned nor implemented in a 'media-proficient' way. It is critical to understand that IP switches for media are not a commodity like in IT networking. Moreover, the architecture of a typical IT network is not adapted to avoid or limit this transfer interference. Oversubscription, even on a macroscopic scale, is more rule than exception in an IT environment. In a typical file-based media environment, the paradigm has changed from sequential work flows to concurrent work flows. Traffic flows are dynamically changing every moment. The architecture has become client-server and server-to-server based. This results in a any-to-any traffic pattern. There is typically no central traffic management system in place that controls and actively manages all different transfers. Moreover, part of the environment is client driven. Therefore, client interactions generate a substantial part of the traffic. Even designed properly, the IP network is not capable of handling that continuously changing load in an adequate way. Media work flows translate into complex data flows. One has to take into account the characteristics of file-based media services to perform this translation. If the media infrastructure is not properly designed and integrated to guarantee an efficient use of its resources, additional traffic load is generated. This only adds to the overall problem.

A classical IT network displays the above described 'unexpected' behaviour when faced with media traffic, with undesirable and unacceptable side effects for file-based media environments. Therefore, the prime objective for a media IP network architecture is to avoid this unexpected behaviour. This translates into the following requirements:

- a stable network environment where no media transfers or flows are lost
- a predictable behaviour. This requires a fundamental understanding of the model under which the network operates and functions, on macroscopic, microscopic and quantum level. This particularly includes the precise interaction between media traffic on the one hand, and the network topology and switch functionality on the other.
- a highly efficient usage of the available bandwidth. This implies a maximal occupancy of the link bandwidth. The network should not introduce by itself, i.e. independent of the source flow characteristics, additional macroscopic fluctuations of the end-to-end throughput of any media flow, unless operating in a best-effort mode, or under a best-effort service-level-agreement (SLA) per flow.
- An optimal response to the particular SLA per traffic class, or more specifically per media flow or transfer.
- Ability to operate in an any-to-any traffic pattern, i.e. media server-to-media server, opposed to, but not excluding, the more prevalent client-server traffic pattern of a typical IT environment.
- Scalability up to and well over 1000 source/destination pairs. In present file-based media environments most servers are connected by Gb/s links. However, 10 Gb/s is slowly being introduced as server connectivity link.
- Full redundancy wherever source and destination media devices allow it.

Some definitions are now stated that will be used throughout the rest of this description. The ingress side (point/port/switch) of a network means is the network location/port/switch where traffic from a source is introduced into the IP network and possibly mixed with other traffic. This is typically the network/switch port(s) directly connected to the source NIC interface. However, if the source traffic follows an exclusive dedicated path further in the network before it is mixed with other traffic, any port along that path could qualify as the ingress point. The egress side (point/port/switch) of network means the network location/port/switch where traffic to a destination is collected and split from all traffic to other destinations. This is typically the network/switch port(s) directly connected to the destination NIC interface. However, if the destination traffic follows an exclusive dedicated path in the network after it is split from other traffic, any port along that path could qualify as the egress point. The term 'point of congestion' refers to the location in the network where different traffic flows come together and possibly interfere with each other. It is to be noted that the term 'point of congestion' also refers to a location in the network where due to a bandwidth mismatch between the link of the incoming traffic and the link of the outgoing traffic a bottle-neck can occur. It is further to be noted that a media server or a server in a media environment is meant to include high bandwidth 'client' devices.

A definition of timescale is in general relative to the link bandwidth (e.g. 100 Mb/s, 1 Gb/s, 10 Gb/s) and to the size of the relevant switch buffers. With 'quantum timescale' is meant a scale of time units in the order of the duration of the individual data units of the media flow. Individual units can be as small as a single byte of a data packet or a few bytes. The timescale is thus at byte level. An individual data unit may however also be larger, i.e. a data packet or a part thereof or a few data packets. As an example, assuming a full length packet of 1538 bytes (7 bytes preamble, 1 byte start-of-frame (SOF), 1500 bytes payload, 14 bytes header, 4 bytes checksum and an inter-frame gap of 12 bytes), a 'quantum timescale' has time units in the order of 1.23 μs in case of a 10 Gb/s link, of 12.3 μs for a 1 Gb/s link or 123 μs for a 100 Mb/s link. In another example, assuming a single byte as a data unit, a 'quantum timescale' has time units in the order of 0.001 μs in case of a 10 Gb/s link, of 0.01 μs for a 1 Gb/s link or 0.1 μs for a 100 Mb/s link.

The timescale used to define the classical average bandwidth is referred to as 'macroscopic timescale'. A macroscopic timescale has units in the order of magnitude of seconds or minutes. In between macroscopic and quantum timescale one can define a microscopic timescale that may have a time unit in the order of a few packets or parts of packets. In the context of a switching device the microscopic timescale may be of the same order or somewhat less than the length of the relevant switch buffer (expressed in time instead of in buffer capacity, whereby the link speed is taken into account).

In the invention a data flow is characterised by a footprint measure at quantum level. Providing this footprint measure at quantum level is the key feature of this invention to solve the problems encountered in the prior art. However, it is to be noted that a footprint measure can also be considered at a macroscopic or a microscopic or quantum timescale. A footprint measure represents a measure for the burstiness of the data flow (e.g. a media flow) on the relevant timescale, related to a burst size that creates an excess of data on top of the bandwidth on that timescale in a network device located in the path over which the data flow is transferred. The footprint measure gives an indication of the difference between the total amount of incoming and outgoing data in the network device over a time interval of one or more time units on the relevant timescale. For example, for a footprint measure at quantum timescale, the time unit must be chosen such that individual data units of the media flow are distinguishable (or detectable) by the network device, i.e. at byte level. The footprint then gives an indication of whether at quantum level there is a risk of excess data. The footprint measure is advantageously set equal to the maximum difference between the amount of incoming and outgoing data in the network device that possibly can occur. Taking into account a footprint measure at macroscopic and/or microscopic timescale advantageously yields additional information on top of the info from the quantum level footprint.

Figure 6:
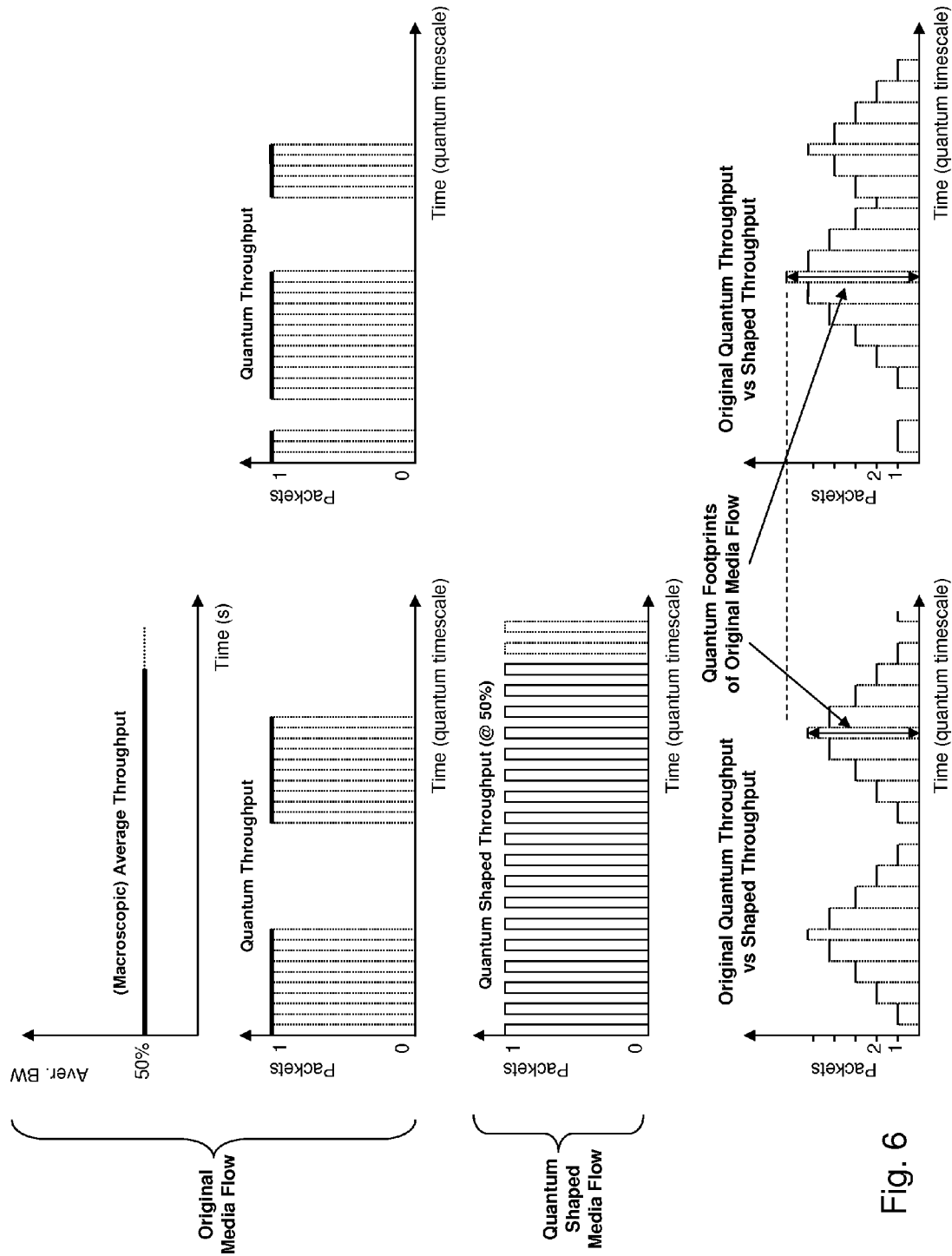
FIG. 6 illustrates the concept of footprint measure.

Some examples are now provided to illustrate the notion of footprint measure. For the sake of simplicity in these example packets of equal length are considered. However, the same principles apply when packets of different lengths are involved in the flow. A first example describes at a more conceptual level the quantum footprint of a media flow in relation to its macroscopic average throughput. It is to be noted that the concept of quantum footprint can be related to any possible virtual reference shaping applied to the media flow. In this example the macroscopic average throughput of the media flow is assumed to be 50% of the link bandwidth (FIG. 6a). On a quantum timescale the media flow consists of bursts of 10 packets interleaved with a gap of the same duration as the bursts (FIG. 6b). FIG. 6c displays the throughput on a quantum timescale if the media flow was to be shaped at 50% at quantum time scale by some network device into separate packets interleaved with a gap of one packet duration. The shaping shown in FIG. 6c can be considered as one of the possible virtual reference shapings mentioned above. FIG. 6d compares the original quantum throughput of FIG. 6b with the shaped quantum throughput of the media flow as shown in FIG. 6c. The maximum difference or the excess of packets is a possible measure of the quantum footprint of the original media flow.

A next example describes the quantum footprint of a similar media flow with an average throughput of 50% of the link bandwidth, but this time consisting of irregular packet bursts, as shown in FIG. 6e. Compared to the same quantum shaped flow of FIG. 6c, this gives a slightly higher difference or excess of packets (see FIG. 6f), indicating the media flow has a higher quantum footprint than in FIG. 6d.

Figure 7:
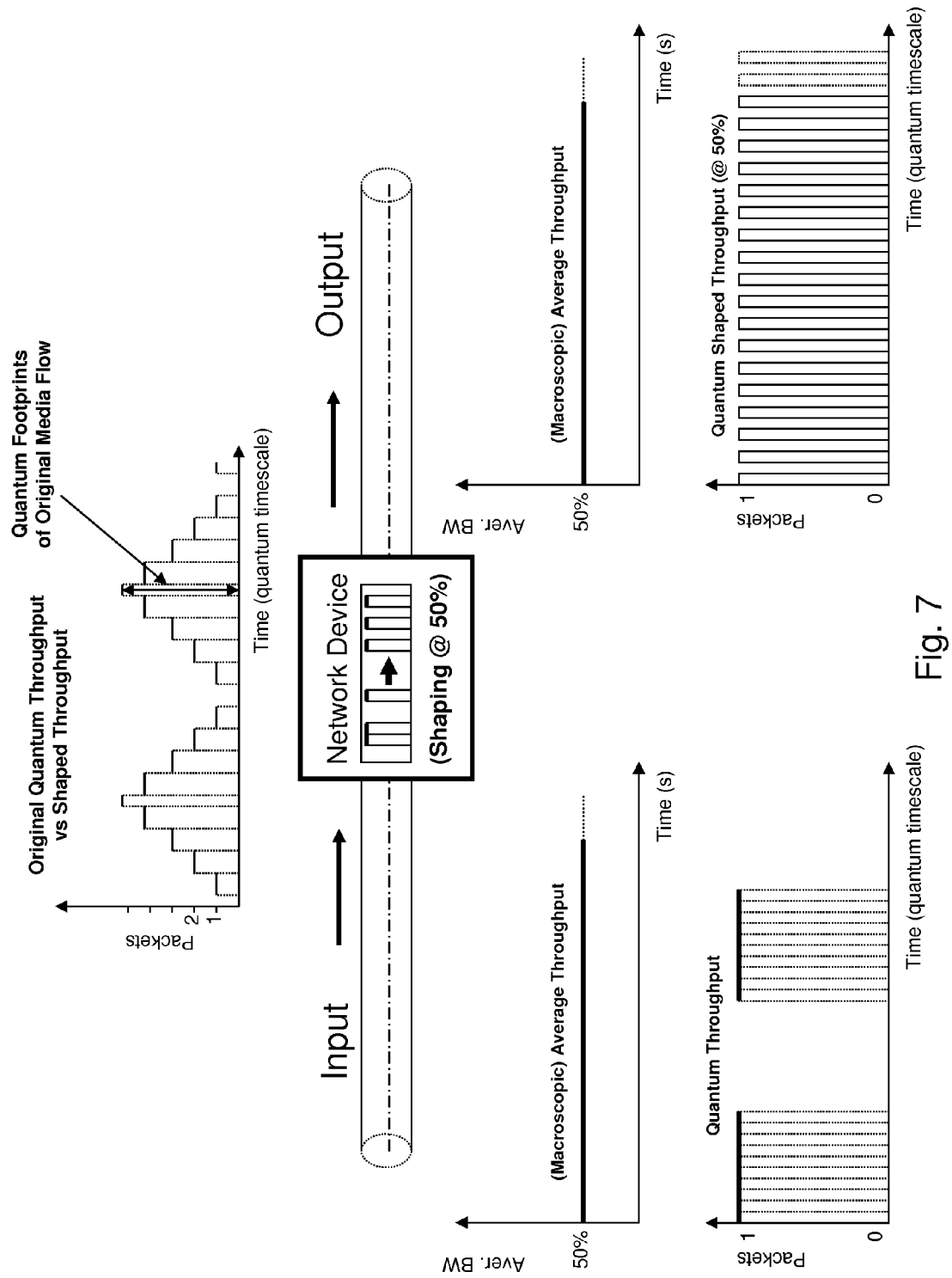
FIG. 7 illustrates the footprint measure of an incoming and outgoing flow of a network device.

The quantum shaping at 50% as conceptually shown above can be the result of an operation of a network device arranged for changing the quantum shape of the incoming media flow (FIG. 7). The bursts already shown in FIG. 6b are received at the input of the network device. The device then performs a traffic shaping at 50%, yielding the shaped flow already shown in FIG. 6c.

Figure 8:
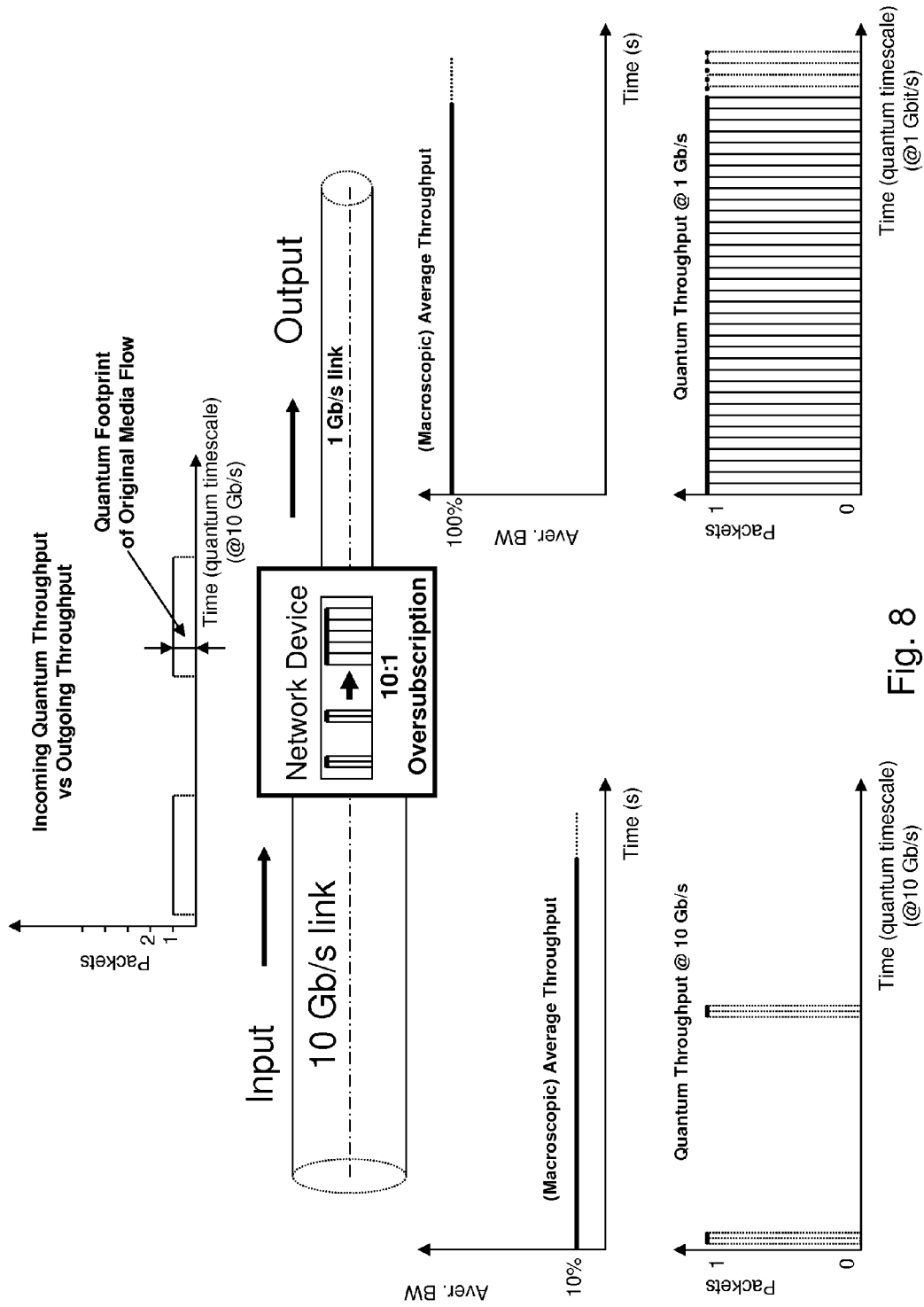
FIG. 8 illustrates an example with a 10:1 oversubscription in the network path.

In the example illustrated in FIG. 8 the quantum footprint of a media flow is described as a result of the passing through a network device, with an incoming link bandwidth of 10 Gb/s and an outgoing link bandwidth of 1 Gb/s. This is an example of a 10:1 oversubscription in the media flow path. Here, a macroscopic average throughput of 10% is the result of a reoccurring burst of two packets. The link of the outgoing flow is completely saturated at 1 Gb/s resulting in a continuous burst. The quantum footprint of the incoming media flow at the network device in this case corresponds to exactly one packet.

Figure 9A:
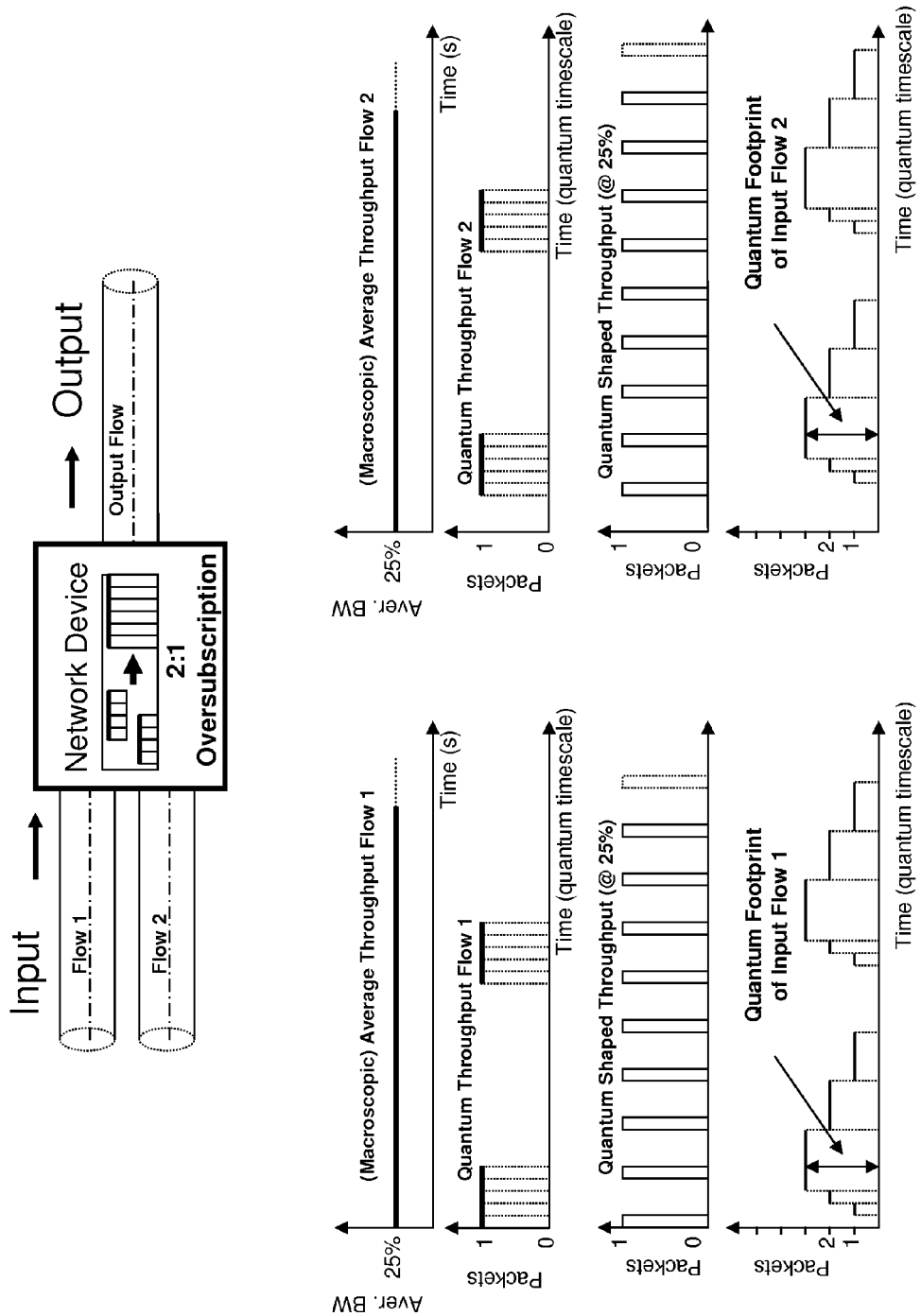
FIG. 9 illustrates an example with two incoming media flows and a 2:1 oversubscription.
Figure 9B:
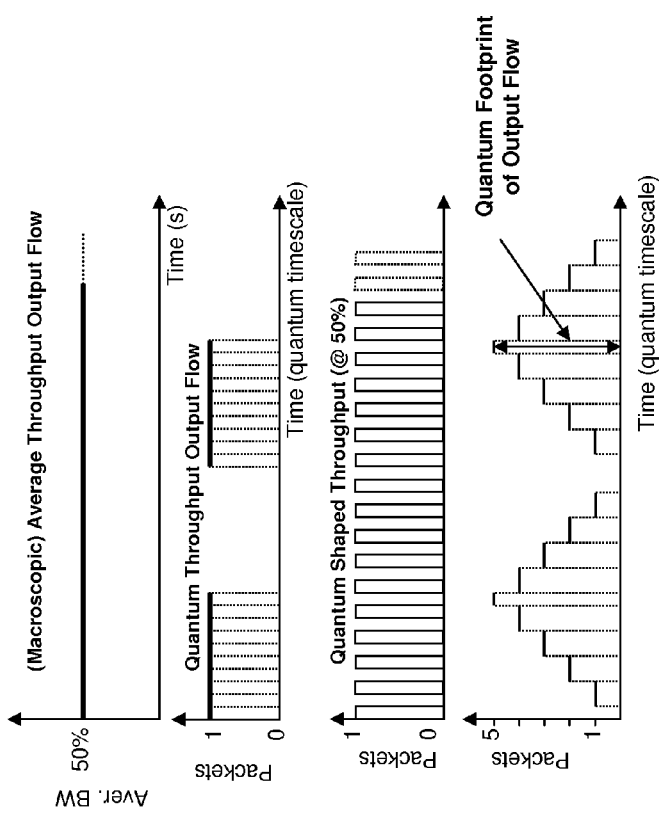
Figure 9C:
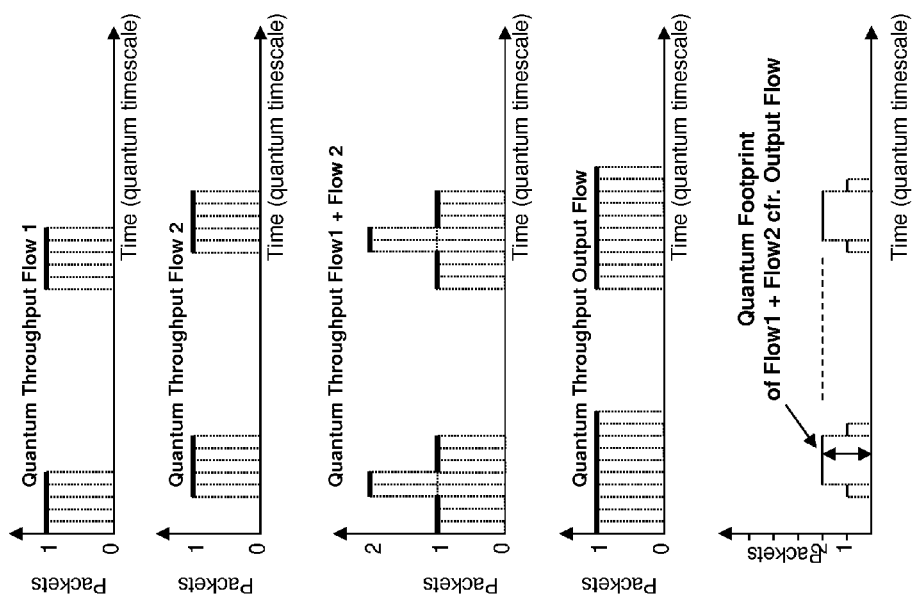

FIG. 9 illustrates an example with a 2:1 oversubscription in the media flow path, whereby two incoming flows enter a network device and exit the device via only one link of the same bandwidth. Both incoming flows are assumed to have a macroscopic average throughput of 25% of the link bandwidth. It is further assumed that both flows have an identical burstiness, shifted in time compared to each other. The resulting macroscopic average throughput of the output flow equals the sum of the macroscopic average throughputs of the incoming flows. On a quantum time scale the output flow consists of bursts with a length equal to the sum of the length of the bursts of the incoming flows. Both incoming flows have an identical quantum footprint (see FIG. 9a). The quantum footprint of the resulting flow (shown in FIG. 9b) is higher than that of each incoming flow. The quantum footprint of the sum of the incoming flows in the network device related to the output flow is shown in FIG. 9c. This quantum footprint is a measure of the buffer filling within the network device.

Based on the footprint measure as described above, a media traffic classification can be defined. Each media flow can be characterised and linked to a specific class. Optionally, a 'traffic flow passport' can be generated per flow. As already mentioned, the fundamental characteristic of the media IP traffic is the abundant presence of large sustained packet bursts. There are various flavours of media traffic that generate an unexpected IP network behaviour as previously described. Some examples are large file transfers, real-time streaming traffic, storage traffic, file system traffic etc. . . . . Each has slightly different specifications. However, they all share burstiness as common prime characteristic.

Figure 10:
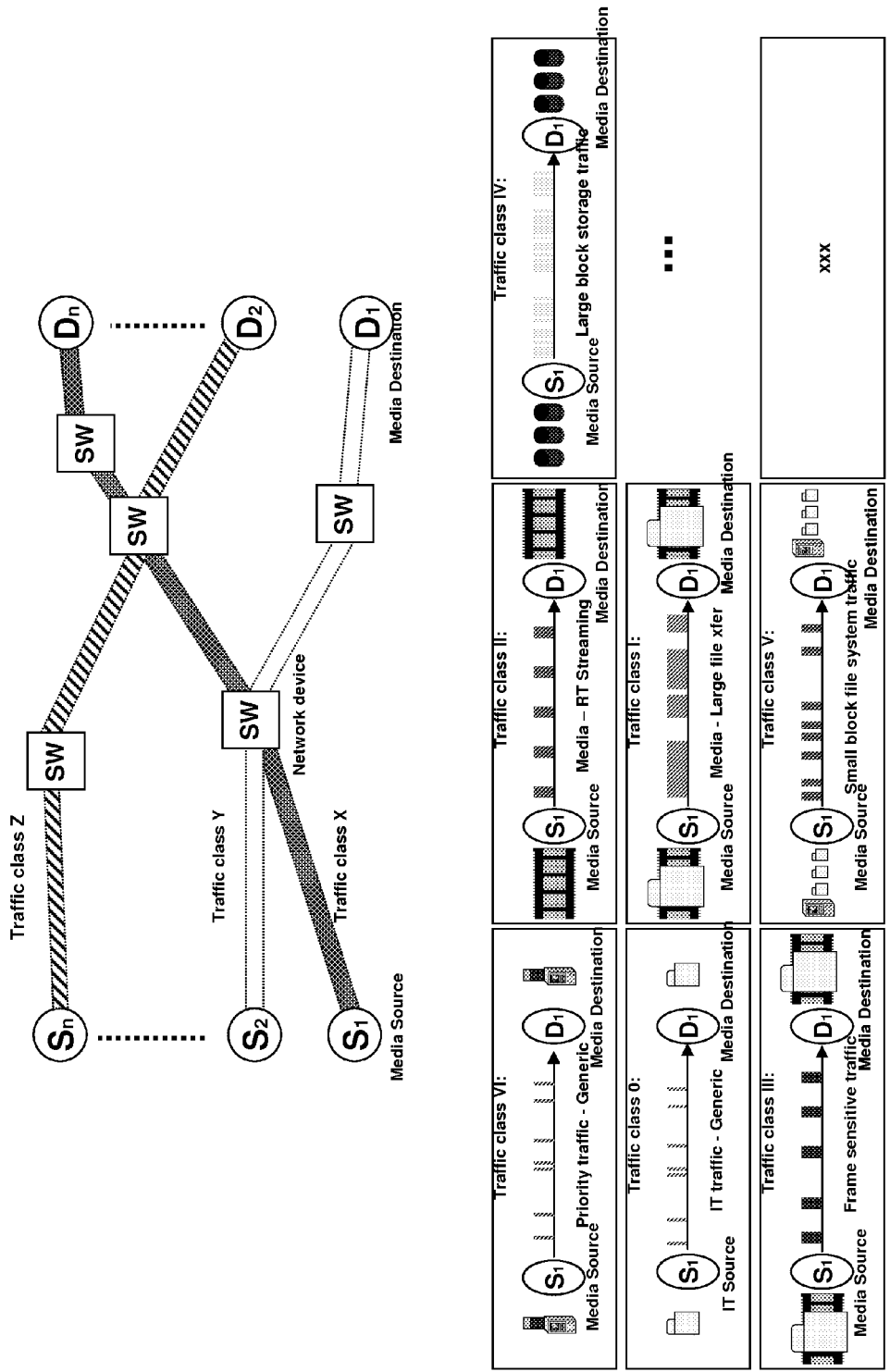
FIG. 10 illustrates an example of a traffic type classification.

A classification of each relevant, though distinctive type of media traffic is a substantial step towards a total solution wherein packet loss is effectively combated. A set of characteristics and specifications for each class has to be defined. The specific details of each class should be chosen to be distinctive so that they warrant a different processing of the traffic by the IP network, possibly even a specific optimisation of the network architecture. This probably leads to different QoS characteristics and settings of the switches in the network per class. Traditional IT traffic is included as an additional class. The classification shown in FIG. 10 is given as an indicative example and will be further expanded both in type of classes, as well as within each class into specific subclasses.

In this example the flows between each different combination of media source-destination pair are so chosen that they belong to a different traffic class. E.g. the flow between Source1 (S1) and destination n (Dn) belongs to traffic class X, between Source2 (S2) and destination 1 (D1) belongs to traffic class Y, etc. . . . . Therefore, all network devices in the path of traffic class X could have a QoS characteristic setting, characteristic to the requirements of traffic class X. In particular, these QoS characteristic settings can be applied to the relevant ports in the path, but can also imply a more general setting of the network device. Similarly, the network devices in the paths of the other classes can have distinctive QoS settings corresponding to their requirements.

The particular traffic flows generated by each source should be quantified by its relevant characteristics and specifications. In particular, its footprints should be determined. A set of tests can be devised to accomplish this, using specific lab equipment as mentioned before. Alternatively, footprints can be predicted based on available performance information. At least a quantum footprint is needed, but a macroscopic and/or a microscopic footprint may provide additional relevant information. Each traffic flow from a source or source instance can then be linked to a specific traffic class and accompanied by a list of more detailed relevant flow specific specs. This leads to a kind of 'traffic flow passport'. While traffic classes are generic, each specific source flow qualifies under a certain class but requires specific parameters. As an example a provisional non-exhaustive traffic classification is given in FIG. 11. An example of a traffic passport is given in FIG. 12, where the specific traffic class of large file transfer is shown. Note that in this figure some additional fields are mentioned that were hidden in FIG. 11. Large file transfer typically consists of (enhanced) ftp transport of very large (+1 GByte) media files between 1 Gb/s enabled servers (server-to-server) residing in the cloud of the media environment. An extension to 10 Gb/s enabled servers may be possible in the future. Traffic typically consists of very large bursts of packets, since traffic content mainly comprises continuous very large files and transfers flow uninterrupted between source and destination. The network protocol is TCP which allows for network flow control. Tuning of TCP stack parameters is possible as long as the source and/or destination servers are not to be treated as a black box. If the application is ardftp, a possible source BW limitation and even quantum footprint manipulation could be possible. QoS is directed to high efficiency and predictability. Subclass 1 has high priority demanding no additional induced BW reduction. Subclass 2 has low priority with possible destination oversubscription leading to additional BW reduction. Subclass 2 has no delay or jitter sensitivity. Only small variation in microscopic/macroscopic bandwidth at the source is to be expected. Overall macroscopic bandwidth should be stable and predictable (for subclass 1). Multiple large file transfers could be directed to the same destination server interface creating a many-to-one destination oversubscription (depending on whether the traffic management system would allow this to happen, which distinguishes subclass 1 from subclass 2). A typical source interface could generate multiple file transfers towards multiple destinations leading to a many-to-many traffic pattern. Large file transfer traffic is setup by a workflow/traffic management system between two media servers (e.g. media file cluster server, ingest server, trans-coding server, . . . ), equipped with 1 Gb/s interfaces. In the future, a 10 Gb/s equipped server could serve multiple 1 Gb/s servers creating a destination oversubscription from bandwidth mismatch between source and destination. Bandwidth and priority can be enforced by a workflow/traffic management system (see below for more details).

Every specific implementation of a media environment consists of specific traffic flows. These particular flows can be classified into more generic traffic classes. Not all traffic classes have to be present in every media environment. Together with the classification, the location of all source/destination combinations per traffic class should be mapped on the total network architecture or topology. The combination of the identified relevant traffic class and its particular source/destination locations defines a traffic class pattern over the network architecture. The mapping of all these traffic class patterns on the network topology should result in a distribution map of the traffic class patterns over time. This distribution map can be static, i.e. the distribution of the classes over the network architecture remains constant. Alternatively, the distribution of the traffic class patterns can change over time, even on a relatively short macroscopic timescale.

The media IP network architecture should be designed such that it optimally accommodates the distribution of those specific traffic class patterns. This can possibly lead to a subdivision or portioning of the overall network architecture into smaller network parts, each with a particular architecture or topology, adapted to the specific requirements of the traffic class(es) that belong to the identified source/destination groups.

Distinction can be made between the physical network infrastructure on the one hand and on the other hand the configuration of the switches including the routing, which defines the logical network topology, and the applied quality of service (QoS), which defines the handling of the traffic on top of the logical network topology. The physical network infrastructure should be optimally designed to support all relevant possible traffic class pattern distributions. A static configuration of the network architecture should accommodate this traffic class pattern distribution. In an advantageous embodiment the network provides the possibility to dynamically (re)configure the logical topology, e.g. by adapting the routing, and/or the network components, i.e. adapting the QoS of the switches, to accommodate the dynamical changes in the traffic class pattern. In another preferred embodiment the configuration could be statically or dynamically tuneable to optimise the network architecture for the particular detailed specifications and SLA of the individual traffic flows and the traffic flow combinations. The proposed dynamical reconfigurations can be performed by a traffic management system (see below for more details).

The prime cause for the 'unexpected' behaviour of an IP network, when faced with media traffic, is packet loss. Hence, packet loss has to be avoided at all cost, if possible. The principle tools to tackle this issue include network topology, Quality-of-Service (buffering, queuing, priority, bandwidth provisioning, . . . ), traffic management, flow control on protocol level and flow control on link level (IEEE802.3x and evolutions (lossless Ethernet)).

Packet loss in a media environment is primarily linked to two different oversubscription conditions. With oversubscription is meant that more traffic is coming in than can be processed or forwarded by the port/device/resource. The first is the macroscopic oversubscription at points of congestion in the network, i.e. sustained oversubscription based on a macroscopic timescale or on macroscopic bandwidth. The other condition is oversubscription at points of congestion of the network at quantum timescale. The points of congestion are typically, but not exclusively, found at the egress side of the network. Note that as long as the backbone design can be considered as a non-blocking time multiplexer, the backbone should be transparent to quantum oversubscription and not be considered as a point of interference. This changes however once 10 Gb/s links are used as source links, matching the bandwidth of an individual backbone link.

Macroscopic oversubscription can be prevented by using a non-oversubscribed network topology, whereby all points of interference (i.e. all points of congestion) are eliminated, e.g. by providing every possibly interfering flow with its own link or path through the network wherever necessary. Further proper traffic restrictions can be provided. The sum of the macroscopic bandwidth of all traffic directed towards the same shared link should not exceed the physical link bandwidth. This can be avoided by enforcing traffic restrictions statically or by a traffic management system. Some control over the macroscopic bandwidth of each involved source is required. This can be accomplished by bandwidth limitation at the source itself or at the ingress point of the network, e.g. by traffic shaping. Sufficient buffering should be provided. Macroscopic oversubscription can be actively overcome by counting on the flow control capabilities of the network protocol, the link, the individual network switch or the complete end-to-end network infrastructure:

TCP: Buffering at the interference point can kick in the flow control before packets are dropped, if the buffers of the source/destination TCP stacks can be properly tuned in relation to the network buffers involved. This is not always possible with proprietary media servers. Sufficient buffering at the interference point should be provided.

UDP: Bandwidth limitation at the ingress point of the network, e.g. by traffic shaping, together with the use of IEEE802.3x link flow control can throttle back the bandwidth of the source. Sufficient buffering at the ingress point should be provided. As a last resort, packet drop could be used to limit the bandwidth. Since UDP has no flow control, it is up to the application layer to recover.

Lossless network components, such as Data Centre Ethernet switches can be used to create a lossless end-to-end network architecture.

The avoidance of macroscopic oversubscription, however, is not sufficient to eliminate the packet loss. In order to eliminate the second cause of packet loss, the quantum oversubscription at the interference point shouldn't exceed the buffer capacity of the congestion point. In other words, when looking at a timescale expressed in time units corresponding in duration to the order of magnitude of individual data units, the storage capacity of the network device where the interference point occurs, should be big enough to store the excess data packets. If not, then packet loss occurs. To accomplish this, the quantum footprint of each of the interfering flows has to be controlled. This allows for a predictive modelling of the quantum oversubscription at the interference point. Subsequently the aggregated quantum footprint can be matched not to exceed the available buffering. This can be done by applying 'quantum shaping' (see further) at the ingress side of each of the participating flows. However, if many packets are buffered at the interference point, flow control could inadvertently kick in to reduce the source throughput, hereby creating an undesirable side effect since macroscopic throughput will be decreased and transfer efficiency will suffer. This in turn automatically influences the output of the quantum shaping and reduces further the quantum footprint. Evidently, which flows share the same link and possible interfere should be controlled statically or by the traffic management system. The specifications of these selected flows define the degree of quantum shaping required for each flow.

Proper application of priority queuing, e.g. at the egress side of the network, could be used to differentiate between particular SLAs of the different traffic classes, if desired. In case of TCP traffic, a mechanism has to be provided to guarantee that ACK packets arrive with minimal delay back at the source. Otherwise, this would disturb the flow control mechanism and decrease the overall efficient use of available bandwidth.

Other QoS mechanisms than priority queuing can be used to optimally accommodate for the requested specifications or SLA of each individual flow or generic traffic class in general. E.g. bandwidth provisioning can be used for providing lower priority traffic flows with a fair share of the remaining bandwidth.

Latency and jitter are typically characteristic requirements included into the specifications of particular traffic classes, as well as timing sensitivity, priority level, . . . . The quantum footprint of the individual flows and the quantum oversubscription of interfering flows are two primary concepts that will influence latency and jitter. Hence, the mechanisms to avoid packet loss described above, especially those concerning the quantum oversubscription, have to be taken into consideration when defining or estimating possible and acceptable latency and jitter. Also the network topology, the number of hops and the latency within each switch can add a determining contribution in jitter and latency.

On the other hand, latency and jitter restrictions, enforced by the SLA of the relevant traffic classes or individual flows, influence the allowed range of applied quantum footprints and consequently quantum shaping on the respective sources and on the quantum oversubscription at points of interference.

All the above requirements have to be taken into account in determining the architecture of a media IP network. According to the required functionalities at each point or position in the network, i.e. at ingress, backbone or egress point, an appropriate selection of the switches with the proper characteristics and features is crucial. Depending on the choice of the available features, the technical implementation and their proper configuration, more or less 'media-awareness' of the IP network can be provided. Additional functionality and optimisation could be provided if dynamical (re-)configuration by a supervising traffic management system is possible.

Traffic shaping retains excess packets above the committed rates in a queue and then schedules the excess for later transmission over increments of time. This smooths bursty traffic rates out. Mostly a leaky bucket scheduling mechanism is used for the later transmission of any delayed packet. This introduces a kind of credit system. As long as the leaky bucket is not completely filled, each arriving packet adds a credit to the leaky bucket and the packet is immediately forwarded. The scheduler 'leaks' credits out of the bucket at a regular time interval. If the bucket is full, packets are retained in the buffer for later transmission. Thus, at any time, the largest burst a source can send into the network is roughly proportional to the size of the bucket.

A side effect of this mechanism is that the shaping only kicks in after an initial burst required to fill up the bucket is transmitted without delay. This effect repeats itself as soon as incoming traffic is lower than the committed or emptying rate of the bucket. Hence, this shaping implementation doesn't guarantee a precisely controlled quantum footprint of the shaped flow.

In order to avoid packet loss, the aggregated quantum footprint of interfering flows has to be precisely managed not to exceed the available buffering (see above). This can be accomplished by controlling very precisely the quantum footprint of each of the interfering flows at the ingress point in the network. Shaping with substantially single packet accuracy is required. This is defined as 'quantum shaping' hereafter. Hence, the above described classical implementation of traffic shaping does not suffice. The main characteristics of shaping at quantum level are:

the shaping is performed on a quantum timescale with a quantum timescale accuracy shaping at the committed rate of 50% or less using a single packet burst size should be possible no packet burst should leak at the start of shaping. The shaping has to start from the first packets onwards.

no packet credits should be accumulated shaping should be possible at the ingress point of the network possible shaping rate should be definable at any bandwidth and not only at 1/2, 1/3, . . . , 1/n but preferably at any percentage shaping above 50% may require a multi-packet burst length or a smaller gap between consecutive frames shaping with multiple packet burst size should be possible even for shaping rates at or below 50%.

to limit latency and jitter for frame sensitive traffic (e.g. Real Time streaming traffic) it should be convenient to be able to shape 'within an applied envelope', e.g. so as to pass each video frame within an integral burst.

The quantum shaping capability is a critical factor in the design of a 'media-aware' IP network.

A classical IT network operates in a best-effort mode. Hence, there is no reason to implement traffic management systems in an IT environment. Surprisingly enough, also media environments lack any traffic management functionality. Only the media asset management (MAM) system has some limited notice of work flows. Most popular MAM systems available today are integrated product suites. Apart from managing the essence and its metadata, they also have limited knowledge about some of the included media services, such as ingest sources and trans-coding engines.

As explained earlier, file-based work flows mimic closely linear tape-based work flows. The resulting data flows are not optimised. Even the most advanced MAM system provides very limited effective load balancing functions, and no active traffic management at all, as it has no idea of the underlying IP network topology. Data flows are hardcoded into the MAM system product by the supplier. Hence, active reconfiguration of the underlying IP network is absolutely impossible. The MAM system has no idea about macroscopic oversubscription, let alone quantum oversubscription. Transfers are just launched as such, without any priority, QoS or enforced SLA. At best, failing transfers are logged red and successful transfer status are flagged green. Other transfers between systems or media services that are not under the control of the MAM system, just coexist on the network. Hence, it is no surprise that traffic interference exists. Due to the peculiar characteristics of media flows, packet loss occurs. Transfers slow down and sometimes even fail. There is definitely a need for a traffic management system that is aware of the network architecture and topology, the traffic flow characteristics and the possible oversubscription conflicts with media traffic.

Figure 13:
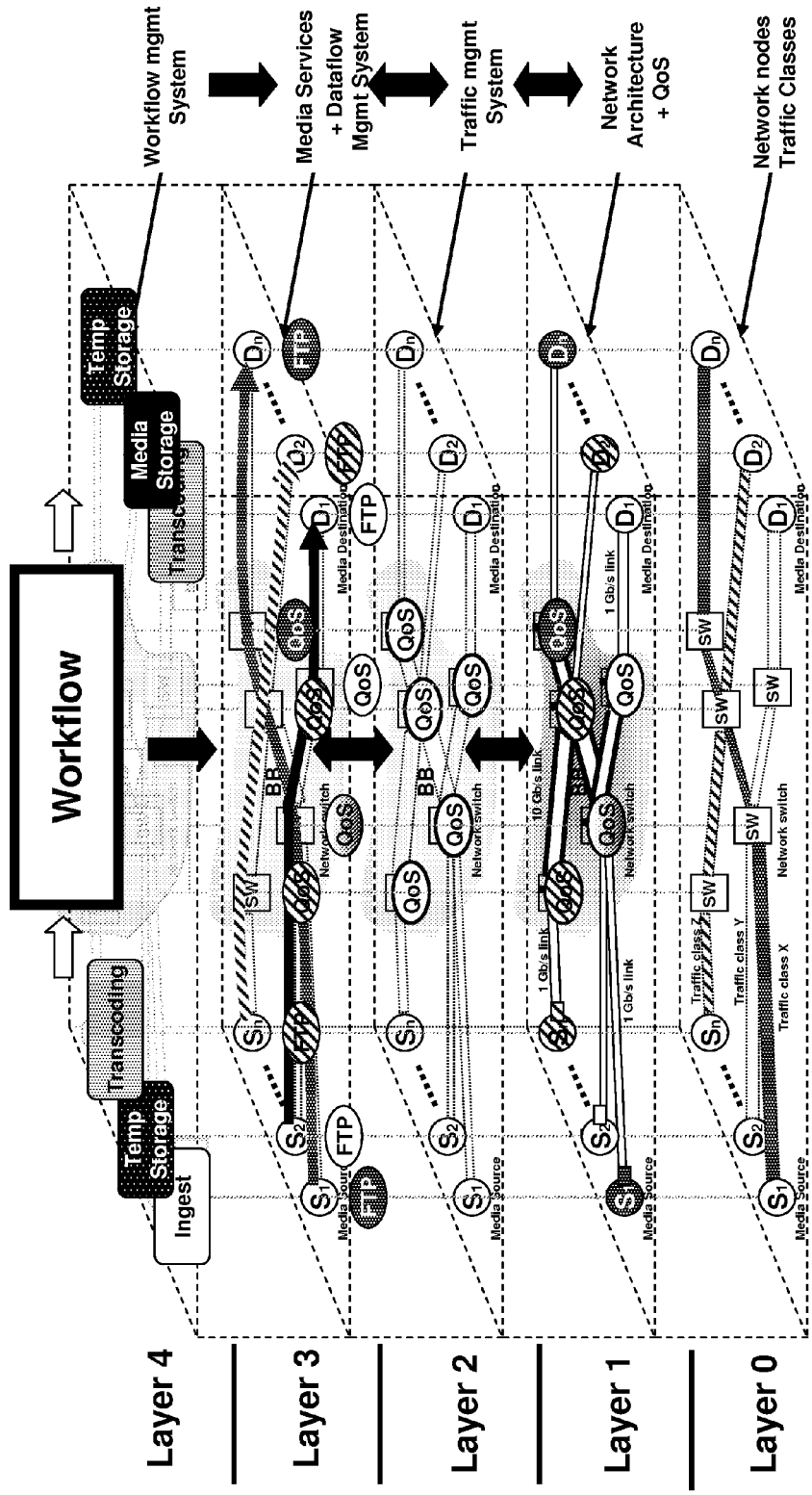
FIG. 13 represents a scheme of the various layers of a multi-layer model for media data transfer.

In an aspect the invention relates to a management system for configuring a network path of a network for transferring a media flow that comprises a traffic management module, that can determine at least one possible path for transferring between possible locations of source and destination a media flow classified according to a quantum footprint as previously discussed. The management system is illustrated in FIG. 13.

The traffic management module may advantageously be part of a several layer management system. At its lowest level (layer 0) a media traffic classification module as previously presented is found. Said module can characterise each media flow and link it to a specified class, whereby optionally a traffic flow passport is generated. At layer 1 of the management system the IP media network architecture (i.e. the physical layer) is designed to optimally accommodate media flows and traffic classes defined at layer 0. Network devices are selected that can be configured with the proper QoS characteristics to avoid packet loss. The traffic management module is situated at layer 2 (see FIG. 13). The module controls the actual media transfers. It is preferably capable of dynamically reconfiguring the appropriate devices in the traffic path to reserve the necessary network resources and to implement the correct QoS settings to ensure that packet loss is avoided. It launches the transfer and starts monitoring the traffic counters from the network to track the status of the transfer. The progress of the ongoing transfer is reported back to the data flow management module at layer 3 (see FIG. 13). The data flow management module determines the most optimal physical sequence of media transfers, corresponding to the logical data flow that is requested by the work flow management layer on top. It is also responsible for the accompanying metadata information flow between the relevant systems. It commands the actual execution of the physical media transfers to the traffic management layer below and receives feedback on the progress of the media transfers. The data management keeps track of the progress of the data flow and its components, and reports the status of the data flow as a whole back to the supervising work flow management module. At the top layer, business processes are translated in terms of work flows. These work flows in turn result in a logical data flows. The work flow management module passes the execution request for the logical data flow down to the data flow management system below. It gets status feedback from the data flow management module and keeps track of the status of the requested work flows.

Further details on the traffic management module are now provided. In the invention the specifications of all media transfers are identified and flows are classified into generic traffic classes (see layer 0). The media IP network architecture and topology is optimised for passing media traffic without packet loss. The network is statically configured to accommodate the relevant traffic class patterns (see layer 1). The network should have the technological capability to accept the predefined QoS settings to avoid both macroscopic and quantum oversubscription on the points of interference. It is up to the traffic management to enforce these settings, if possible dynamically, given the defined traffic patterns and flows, and to guarantee that macroscopic oversubscription is avoided and to control quantum oversubscription so that no 'unexpected' behaviour occurs. The traffic management system should also actively monitor the correct network components in order to track the status of the ongoing transfers.

There are at least two main sources that can trigger media traffic flows over the network and that require action of the traffic management system, namely the work flow driven media traffic flows and the user action generated media traffic.

In the work flow driven case, the work flow management system (see layer 4 in FIG. 13) launches a certain work flow. This process could e.g. be triggered by a user action or an automated process. The work flow management system translates the work flow into an optimal logical data flow using knowledge of the available media services. It passes the request down to the data flow management system (see layer 3). At the next lower layer, the data flow management system has an even more detailed knowledge about the media service architecture and the underlying infrastructure. It should keep track of the available media service resources and be kept aware of the present load on the network infrastructure by the traffic management system. This should allow the data flow management system to take into account the macroscopic bandwidth requirements and existing macroscopic oversubscription conflicts. It uses this knowledge to load balance the data flow between the relevant media services and selects the optimal source/destination pairs. It then commands the traffic management system to execute the defined traffic flows with the correct SLA, QoS, traffic class and other specifications defined at layer 0. If necessary, the traffic management system dynamically reconfigures the appropriate devices in the traffic path to reserve the necessary network resources and to implement the correct QoS settings. It thereby enforces that macroscopic oversubscription is avoided and effectively controls quantum oversubscription to avoid packet loss by all the means and mechanisms described earlier (see layer 1).

It starts monitoring the traffic counters from the relevant network devices in order to track the status of the forthcoming transfer. If the transfer type allows it, the traffic management system then sets up the necessary connection between source and destination and launches the transfer. Otherwise it should signal the system responsible for the start of the transfer, possibly the source itself, that the network is properly configured and that the transfer can proceed. The setup and launching of the transfer could make use of a kind of service or message bus, possibly but not necessarily based on a service oriented architecture, or point-to-point integration architecture. The progress of the ongoing transfer is reported back to the data flow management system.

If the media traffic is generated by user actions, e.g. in the case of a high resolution editing process, the traffic management can only reserve and reconfigure the proper network resources belonging to that specific media flow or traffic type class between the selected source/destination pairs. The request could possibly be triggered by a planning schedule, a user logon on a certain system, or even by a static reservation of some kind. However, the media traffic flows themselves cannot be launched or controlled by the traffic management system. Monitoring is evidently possible and even necessary to track the availability of all resources.

In case of a new request for an urgent media transfer with high priority, the traffic management system could intervene pre-emptively, and reconfigure the network to e.g. stop, delay or slow down existing media flows, in favour of the transfer with higher priority.

If no work flow or data flow management system exists, the traffic management system should be able to perform its elementary functions independently, e.g. by means of a cockpit application to manually reconfigure the necessary resources, and provide the monitoring function of the status of the running transfers.

Data Flow Management Module—Media Services

At this layer resides the detailed overview of the media production architecture, the media services and how they are integrated and connected to each other.

The data flow management module should have a detailed model of the available media resources, their functionality and services, capacity and the bandwidth in between them. It also must keep track of the data flows that are actually running over the infrastructure at all times, in order to determine the remaining free resources. It has a macroscopic view on available and used bandwidth. It therefore should able to take macroscopic oversubscription at interference points into account. However, it has no knowledge of the processes playing at the quantum time-scale. Hence, it is completely oblivious about quantum oversubscription.

The data flow management module main task is to determine the most optimal physical sequence of media transfers, corresponding to the logical data flow that is requested by the work flow management layer on top. It has to take into account the actual load on the architecture and the specifications of the traffic flows it wants to execute. It gets part of that information from the generic traffic class of the individual flows. Another part comes from the particular specifications defined for each flow. And finally, the requirements linked to the work flow at hand define the scope and overall SLA in which the data flow and each individual media transfer is positioned. Its macroscopic view should provide deep enough architectural knowledge to be able to optimally load balance the physical flows over the available media service resources. The data flow management module is also responsible for the accompanying metadata information flow between the relevant systems. To fulfill that additional task, it could make use of a kind of service or message bus, possibly but not necessarily based on a service oriented architecture or point-to-point integration architecture. It commands the actual execution of the physical media transfers to the traffic management layer. However, it is the task of the traffic management module to actually setup, tune and reconfigure the network resources and physically launch or trigger the launch of the transfers.

The data flow management is in continuous communication with the systems in the layer below and above. The traffic management module reports back regularly on the progress of the media transfers. The data management keeps track of the progress of the data flow and its components and reports the status of the data flow as a whole back to the supervising work flow management module.

As described in the context of the traffic management module, the function of the data flow management system, if at all presently available in the existing media environments, resides mostly tightly integrated in the MAM systems. However, it doesn't belong to the essential functionalities of a MAM system. For the same reasons as listed for the traffic management module it should be executed by an independent system that has a complete picture of the media environment.

Work Flow Management Module

At the work flow management module layer, business processes are translated in terms of work flows. These work flows in turn result in a logical data flows. A kind of business process routing is defined. The work flow management module is not concerned with the actual physical concatenation and implementation of the data flow, nor the resulting underlying media transfers. Therefore, the work flow management module only has to be aware of the logical concept of essential available media services. It passes the execution request for the logical data flow down to the data flow management module (see layer 3).

As explained earlier, in most media environment today, file-based data flows mimic closely linear tape-based data flows. This is not the responsibility or fault of the work flow system, since it only deals with the logical data flow. It typically concatenates functions offered by media services together in order to define the task at hand. It is up to the underlying data flow management module to interpret the logical concatenation and, with its knowledge of the physical implementation and underlying architecture, to optimise the resulting physical data flow and media transfers.

The work flow module is arranged for providing the following functionalities:
  a user interface to link media services together to define the logical order of the different steps required by the business process or work flow.
  It requires a kind of database of available media services to pick and choose the relevant services from and a mechanism to link them.
  Means to define some requirements in terms of a service level agreement
  Ability to store the resulting work flows and pass the execution request down to the data flow management module.
  It can get status feedback from the data flow management module
  It is capable to keep track of the status of the requested work flows.

The user interface and control over some of its functionalities can be integrated in the client of the available MAM system.

Although the invention has been described above in the context of media flows, it will be clear to the person of skill that the same principles can be applied to data flows with similar characteristics containing data from another application field.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the spirit and scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A method for configuring a network path of a network for transferring an individual data flow end-to-end from a source device to a destination device, said path comprising at least one network device susceptible of network congestion and arranged for storing at least a part of said individual data flow, the method comprising the step of:
  determining at least one possible network path for transferring said individual data flow end-to-end from said source device to said destination device, said individual data flow having been previously classified according to a footprint measure of said individual data flow, said footprint measure being indicative of a possible difference between the total amount of incoming data and the total amount of outgoing data in said at least one network device over a time interval having a duration of one or more time units, whereby said time unit is so chosen that individual data units of the individual data flow are distinguishable at byte level by said at least one network device; and configuring said at least one network path according to said footprint measure.

2. The method for configuring as in claim 1, further comprising, before the step of determining, a step of classifying said individual data flow according to said footprint measure.

3. The method for configuring as in claim 2, wherein prior to the step of classifying a step is performed of determining said footprint measure.

4. The method for configuring as claim 1, wherein said step of configuring the at least one network path comprises setting at least one parameter related to the physical layout of said network path.

5. The method for configuring as in claim 1, wherein said step of configuring comprises setting at least one parameter related to the logical layout of said network path.

6. The method for configuring as in claim 5, wherein said setting at least one parameter related to said logical layout comprises setting the routing of said at least one network device.

7. The method as in claim 5, wherein said setting at least one parameter related to said logical layout comprises setting at least one quality-of-service parameter of said at least one network device.

8. A management system for configuring a network path of a network for transferring an individual data flow end-to-end from a source device to a destination device, said network path comprising at least one network device susceptible of network congestion and arranged for storing at least a part of said individual data flow, said management system comprising a traffic management module arranged for determining at least one possible path for transferring said individual data flow end-to-end from said source device to said destination device, said individual data flow having been previously classified according to a footprint measure of said individual data flow, said footprint measure being indicative of a possible difference between the total amount of incoming data and the total amount of outgoing data in said at least one network device on a network path over a time interval having a duration of one or more time units, whereby said time unit is so chosen that individual data units of the individual data flow are distinguishable at byte level by said network device, and the management system further arranged for configuring said at least one network path according to said footprint measure.

9. The management system as in claim 8, wherein said traffic management module is arranged for imposing traffic restrictions and/or for shaping traffic to be transferred over said network path.

10. The management system as in claim 8 wherein said traffic management module is further arranged for dynamically reconfiguring said at least one network path.

11. The management system as in claim 8, wherein said traffic management module is further arranged for launching said individual data flow.

12. The management system as in claim 8, wherein said traffic management module is further arranged for monitoring said at least one network device.

13. The management system as in any of claim 8, further comprising a data flow management module for controlling said individual data flow, said data flow management module arranged for communication with said traffic management module and for controlling said traffic management module.

14. The management system as in claim 13, wherein said data flow management module is arranged for receiving information on the load of said network.

15. The management system as in claim 13, further comprising a work flow management module for managing work flows of a process comprising a sequence of operations on at least one file containing media related data, said work flow management module arranged for communication with said data flow management module.

* * * * *